United States Patent Office 3,822,202
Patented July 2, 1974

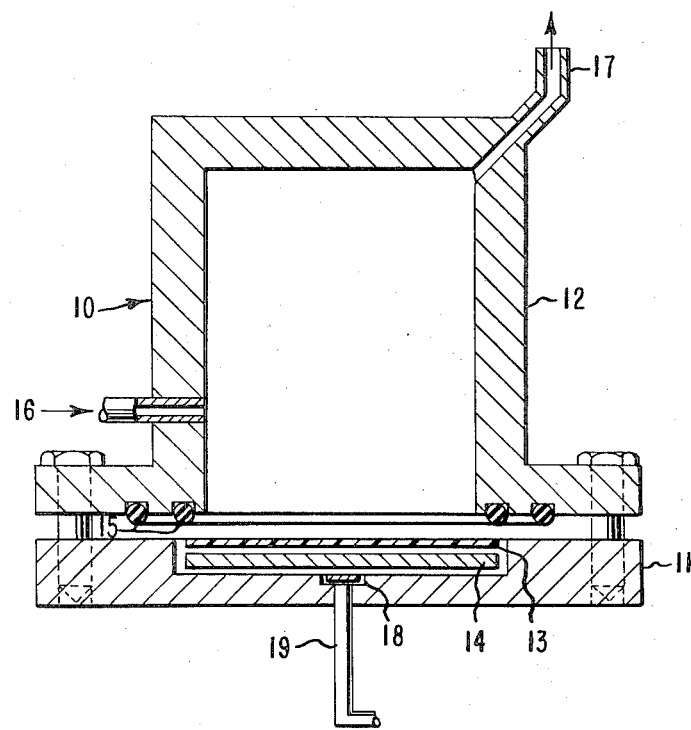

3,822,202
HEAT TREATMENT OF MEMBRANES OF SELECTED POLYIMIDES, POLYESTERS AND POLYAMIDES
Harvey Herbert Hoehn, Hockessin, Del., assignor to E. I. du Pont de Nemours and Company, Wilmington, Del.
Filed Nov. 2, 1972, Ser. No. 303,210
Int. Cl. B01d 13/00
U.S. Cl. 210—23      32 Claims

ABSTRACT OF THE DISCLOSURE

Certain polymeric membranes are heated at elevated temperatures to improve their gas separation abilities.

BACKGROUND OF THE INVENTION

Field of the Invention

This invention concerns a method of improving the utility of selected polymers as gas separation membranes.

Prior Art

Polymeric materials useful as semipermeable membranes are known. U.S. Pats. 3,172,741 issued to Jolley and 3,567,623 issued to Richter and Hoehn disclose semipermeable membranes made from various polymers.

Copending application of Hoehn and Richter Ser. No. 273,802, filed July 20, 1972, now abandoned, discolses a selected group of polyimides, polyesters and polyamides which are useful as gas separation membranes because of their molecular morphology. These are aromatic polyimides, polyesters and polyamides in which the repeating unit of the main polymer chain (a) has at least one rigid divalent subunit, the two main chain single bonds extending from which are not co-linear,
(b) is sterically unable to rotate 360° around at least one of the bonds noted in (a), and
(c) has 50% or more of the atoms in the main chain of the repeating unit of the polymer as members of aromatic rings.

None of the above art discloses improvement of gas separation properties as a result of heat treatment.

DESCRIPTION OF THE INVENTION

There has now been discovered a process for preparing improved gas separation membranes by (1) dissolving in a suitable organic solvent a polyimide, polyester or polyamide in which the repeating unit of the main polymer chain is characterized by (a), (b) and (c) above; (2) forming a membrane from this solution by casting or extruding it into a film or spinning it into a hollow tube or fiber; (3) removing sufficient solvent by evaporation and/or by solvent extraction to render the membrane self-supporting; and (4) heat treating the resulting membrane at a temperature in the range of about 150° C. up to just below the temperature at which the mechanical integrity, strength and other physical properties of the polymeric membrane are significantly impaired. Generally speaking the highest temperature used should be just below the softening point of the polymer. For practical purposes the range of 150–340° C. can be used. Preferred is the range of 200–340° C.

The membranes obtained in step (3) may be further air-dried or vacuum-dried at room temperature or at a temperature below 150° C. prior to the heat treatment of step (4).

The time of heat treatment may be varied widely. The only essential is that the heating be long enough to bring the membrane to the desired heat treatment temperature. When very thin membranes are heat-treated by efficient means, e.g., by infrared heating, substantial improvement in membrane properties may be obtained within one second. Further improvement may be obtained by continuing the heat treatment up to six hours or more. There is no significant advantage in continuing the heat treatment beyond 24 hours. The improvement takes place while the membrane is at a temperature above 150° C. and is not affected by the rate or manner of cooling after the heat treatment. Care should be taken that the combination of time and temperature used do not significantly impair the mechanical integrity, strength, or other physical properties of the polymer.

The heat treating process may be carried out in air, in an inert gas such as nitrogen or helium, or under vaccum. Where the heat treatment is to be continued for more than a few seconds, or is to be conducted at high temperatures, e.g., above 350° C., it may be preferable to conduct the heat treatment in an inert gas or under a vacuum to avoid oxidative degradation of the membrane, although this is not essential.

As illustrated in the examples which follow, the heat treatment step of the present invention produces a substantial increase in the selectivity with which the treated membranes separate gases having different molecular weights and/or molecular sizes. With some of the polymers the improved selectivity obtained by heat treatment is also accompanied by an increase in the overall flow rate of small gas molecules, e.g., hydrogen. With other polymers, the flow rates may be somewhat reduced by heat treatment, although the molecular morphology of the selected polymers ensures that a practical flow rate will be retained.

The polymers for use as membranes in the process of this invention are selected because of the inability of their molecules to pack densely as discussed below. While it is desired not to be bound by theory, it may be postulated that the improvements effected by the heat treatment are the result of increased uniformity of packing of the polymer molecules. This results in a network of molecules having a free volume favorable to high transport of small gas molecules such as hydrogen but unfavorable to transport of larger molecules such as methane, higher hydrocarbons, CO, $CO_2$, $SO_2$ and the like. Because of their molecular morphology, the unheated polymers are capable of only a certain degree of closeness of packing in the membrane. However, this degree of closeness is not uniformly achieved in ordinary casting or spinning processes. Heating above 150° C. appears to relax the polymer chains so that more of the chains achieve their maximum closeness of packing and thereby a maximum uniformity of packing and free volume. Such increased uniformity of structure may account for the improved gas separation properties observed.

Heat treatment as in the present invention would be deleterious to membranes of polymers of some known types other than those employed herein. It is known that membranes of such materials as cellulose esters, vinyl-type polymers, and even ordinary polyimides, polyesters and polyamides tend to have their molecules closely packed when they are formed into membranes. Heat treatment of such membranes serves only to reduce their permeability.

The present invention is a method for improving a gas separation membrane of which at least 50% by weight consists essentially of a polymer whose main chain has a repeating unit containing at least one group selected from the group aromatic imide, aromatic ester and aromatic amide in which said repeating unit (a) contains at least one rigid divalent subunit, the two main chain single bonds extending from which are not colinear,
(b) is sterically unable to rotate 360° around one or more of said main chain single bonds, and
(c) has at least 50% of the atoms in the main chain as members of aromatic rings.

These criteria define predominantly aromatic polymers whose molecules are unable to pack densely because of having within the repeating unit of the polymer chain at least one main chain single bond which makes an angle with at least one next adjacent main chain single bond and around which the polymer molecule is sterically unable to rotate freely. While it is not intended to be bound by speculation, it is considered that configurations as defined above render such polymer molecules incapable of packing as densely together as polymer molecules without such configurations. Specifically, the bend in the polymer chain caused by the noted angle cannot be accommodated in packing by free rotation around the bond. The structure of the solid polymer is thus kept permanently more "open" to the passage of small gas molecules, resulting in higher flux rates for the passage of such gases.

The polyimides from which membrane materials of this invention are selected may be represented generally as polymers in which the repeating unit is as shown in formula I:

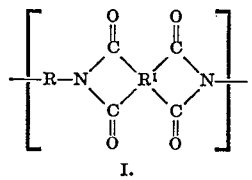

I.

wherein R and $R^1$ are, respectively, divalent and tetravalent organic radicals, i.e., with their bonds stemming from carbon atoms. These are illustrated in more detail below.

The polyesters from which the membrane materials of this invention are selected may be represented generally as polymers in which the repeating unit is as shown in formula II:

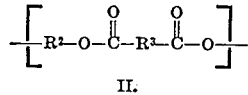

II.

wherein $R^2$ and $R^3$, alike or different, are divalent organic radicals, i.e., with their bonds stemming from carbon atoms. These are also illustrated in more detail below.

The polyamides from which the membrane materials of this invention are selected may be represented generally as polymers in which the repeating unit is as shown in formula III:

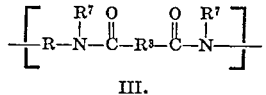

III.

wherein R and $R^3$ are defined as above and $R^7$ is hydrogen, lower alkyl, or phenyl. These are illustrated in more detail below. The term "lower" in the specification and claims means 1–6 carbons.

The particular polyimides, polyesters and polyamides useful as membranes in this invention are selected on the basis of the three criteria noted above. Requirement (a) specifies that the repeating unit of the polymer contain at least one rigid divalent subunit, the two main chain bonds from which are not colinear. The rigid subunits in a polymer chain are those atoms, groups of atoms, or cyclic structures which are joined to other units in the main chain by single bonds between two atoms. The single bond junction points in a polymer main chain are readily recognized from the structural formula of the polymer repeating unit and these points are the demarkation points between rigid subunits. Such a subunit is rigid because the angle between the two single bonds extending from the subunit is fixed. The two bonds from a rigid subunit are colinear (L) if they form an angle of about 180° (particularly 170–180°) or if they are parallel and offset not more than 2 A. Otherwise, they are noncolinear (N). Preferred polymers have 2–10 mainchain rigid subunits in the polymer repeating unit.

Requirement (b) specifies that the polymer chain contain at least one bond between rigid subunits around which bond the polymer chain is sterically prevented from rotating 360°. This determination is based on the well-known textbook rules of stereochemistry. These rules are strictly incorporated into the design of the Corey-Pauling-Koltun Models (CPK Models) described by W. L. Koltun in Biopolymers, 3, 665–79 (1965) and which are available from the Ealing Corporation, 2225 Massachusetts Ave., Cambridge, Mass. 02140.

A practical determination of whether a polymer satisfies requirements (a) and (b) is made as follows:

(1) Draw the conventional two-dimensional representation of the polymer repeating unit and indicate the single bonds in the main polymer chain which separate rigid subunits.

(2) For each rigid subunit indicate whether the two main chain bonds stemming from it are colinear (L) or noncolinear (N).

(3) Construct the CPK Model of the polymer unit and from the model determine which of the bonds indicated in (1) are restricted from rotating through 360°. Persons skilled in the field of stereochemistry would, of course, not need the model to make this determination. Illustrations of the above steps and the one which follow appear in the examples below.

The determination of requirement (c) that at least 50% of the atoms forming the backbone chain of the repeating unit of the polymer be in aromatic groups can readily be made from the two-dimensional representation of the polymer repeating unit noted above. The main chain atoms which are counted are those in the single atom and cyclic rigid subunits. In cyclic subunits in which the two single bonds stem from different atoms, all member atoms in the basic ring of the subunit are counted, e.g., p-phenylene counts 6 atoms. Side chain atoms such as hydrogen, carbonyl oxygen, alkyl groups, haloalkyl groups, carboxyl groups, ester groups, halogen substituents and other pendant groups are not counted. If both single bonds from a cyclic rigid subunit stem from the same atom, only that one atom is counted, e.g., 1,1-cyclohexylene counts 1 atom, the remaining pentamethylene being a pendant group. Aromatic rings include not only the hydrocarbon aromatic rings such as benzene, naphthalene, anthracene, penanthrene, pyrene, chrysene, naphthacene, indene, and the like, but also those heterocyclic rings commonly acknowledged to have aromatic character such as furan, benzofuran, thiophene, pyrazole, indole, benzimidazole, pyrazine, carbazole, pyridine, quinoline, acridine, imidazole, isoimidazole, and the like. See, for example, R. C. Fuson, "Advanced Organic Chemistry," John Wiley & Sons, Inc., New York, N.Y., 1950, Chap. XXIV, "Aromatic Character."

In the examples showing the determination of the above criteria, the single bonds separating rigid subunits are marked by drawing dotted lines across the two-dimensional representation of the polymer repeating unit and are identified by the letters A, B, C, D, etc. The rigid subunits are numbered 1, 2, 3, 4, etc. The rigid subunits are then tabulated along with a notation for each whether its two main chain single bonds are colinear (L) or noncolinear (N) and a notation as to which, if any, of these bonds are restricted from rotating 360°. The proportion of the main chain atoms in the repeating unit which are in aromatic structures is also shown.

The invention also contemplates the use of copolyimides, copolyesters and copolyamides in which the respective repeating units of the copolymer members individually satisfy criteria (a), (b), and (c), as well as physical blends of two or more of these materials meeting these criteria and also copolyimides, copolyesters, copolyamides and blends in which one or more members meet these criteria, those members constituting 50% or more of the membrane by weight.

In a preferred embodiment of this invention, a polymer which satisfies requirements (a), (b) and (c) is dissolved at about 20% concentration in an anhydrous organic solvent. The solution is filtered to remove solids and is freed of dissolve gases. At a temperature in the range from room temperature up to 150° C., the solution is cast in film form onto a support or spun through a cored spinneret to give a hollow fiber. The solvent is then removed. For example, if a uniform membrane is desired, the solvent is evaporated preferably by heating at about 90–110° C. On the other hand, if an asymmetric membrane is desired, the film or fiber structure is quenched in a liquid which is a nonsolvent for the polymer and a solvent for the organic solvent already present. Preferably the quench liquid is water and the organic solvent is water-miscible. The membrane is then heat-treated by bringing it to a temperature in the range from 150–500° C.

Apparatus suitable for separation of gases, as removal of hydrogen from a mixture of hydrogen and methane, by a membrane in film form is shown in the Figure. In this Figure base section 11 and upper section 12 of permeation cell 10 are machined from corrosion-resistant metal. Film 13, the separation membrane, is in the form of a disk mounted against a porous support disk 14. When upper section 12 of the cell is bolted to lower section 11, synthetic elastomer O-rings 15 seat firmly around the periphery of the membrane and against the metal. Inlet 16 for feeding gases into the cell is near the membrane. Bypass of a portion of the feed gas is provided through exit 17. Gas passed through membrane 13 is collected through a metal frit 18 into exit pipe 19. Pipe 19 is connected to a metal gas receiver (not shown) which is fitted with pressure measuring devices.

Some of the terms used to describe the performance of the membranes of this invention are defined as follows:

Selectivity

The selectivity of a membrane in separating a two-component fluid mixture is defined as the ratio of the rate of passage of the more readily passed component to the rate of passage of the less readily passed component. Selectivity may be obtained directly by contacting a membrane with a known mixture of gases and analyzing the permeate. Alternativley, a first approximation of the selectivity is obtained by setting up the ratio of the rates of passage of the two components determined separately on the same membrane. Rates of passage may be expressed in GTR or cB units. Thus $S_{H_2/CH_4}=200$ indicates that the membrane in question allows hydrogen gas to pass through at a rate 200 times that of methane.

Gas Transmission Rate (GTR)

One characterization of membrane permeability used in this disclosure is the gas transmission rate. GTR data represent the steady state rate of gas transmission through a membrane. GTR values are not normalized for membrane thickness. For homogeneous membranes the GTR is inversely proportional to the sample thickness. When the thickness of the active part of the membrane is not known, e.g., in asymmetric membranes, the GTR is still a valid permeability characterization. GTR values determine the value-in-use of the membrane in a permeation device. Derivation of the GTR equation follows.

The volume of gas transmitted through a membrane is directly proportional to the area, time, and pressure of the permeation test as shown in (1).

$$GTR = \frac{volume}{area \times time \times pressure} \quad (1)$$

The units selected for volume, area, time, and pressure are cm.³ (STP), 100 in.², 24 hours, and atmosphere, respectively. Substituting these units in (1) gives (2):

$$GTR = \frac{cm.^3 \, (STP)}{100 \, in.^2 \times 24 \, hr. \times atm.} \quad (2)$$

Except in special cases, all measurements of transmitted gas as cm.³ (STP) were made at 30° C. GTR values were usually measured at gas pressures of 39.7, 114.7, 314.7, 614.7, and 1014.7 p.s.i.a.

Centibarrer Permeation Coefficient (cB)

The standard unit for the permeability coefficient in observing the permeability of polymer films to gases is defined as the barrer which is equal to:

$$\frac{10^{-10} \, cm.^3 \, (STP) \times cm.}{cm.^2 \times sec. \times cm. \, Hg}$$

in which cm.³ (STP) is the volume of permeated gas at standard temperature and pressure,
cm. is the thickness of the film,
cm.² is the area of film,
sec. is the time, and
cm. Hg is the pressure.

(ASTM Test D1434–66, 1970 ed., Part 27, pages 447 and 453).

In the present application, permeabilities are reported in centribarrers (cB), a unit which is 1/100 of the barrier as defined above. Centibarrer values can be calculated from the relationship:

$$cB = GTR \times film\ thickness\ in\ mils \times 0.6.$$

As stated previously, the polymers used in this invention are characterized by having the three elements (a), (b) and (c). As long as these are present in the polymer, R, R² and R³ may be any divalent organic radical and R¹ may be any tretravalent organic radical. It is to be noted that it is possible to prepare polymers where all the R's are derived from compounds shown in the various tables below but would still not have elements (a), (b) and (c). Such polymeric materials are not within the scope of the invention, but may be used in combination with the polymers of this invention in amounts up to 50% by weight.

The examples give various illustrations of the radicals which are used. Without any intent of limitation, the radicals may be further illustrated as follows:

In formulas I, II and III, the divalent radicals R, R² and R³ may be substituted or unsubstituted phenylene, naphthylene, biphenylene, anthrylene, or

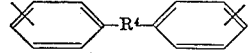

where R⁴ is alkylene (including alkylidene) of up to 18 carbon atoms, aralkylene of up to 18 carbon atoms, haloalkylene (including haloalkylidene) of up to 18 carbon atoms in which the halogen(s) are fluorine, chlorine, bromine or iodine, oxygen, sulfur,

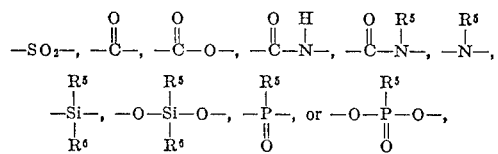

in which R⁵ and R⁶ are lower alkyl or phenyl. Preferred embodiments of R⁴ are alkylidene, haloalkylidene, aralkylidene, oxy and iminocarbonyl (—NH—CO—). Preferred alkylene and haloalkylene moieties in R⁴ are those of 1-3 carbon atoms.

The tetravalent radical R¹ may be a substituted or unsubstituted grouping:

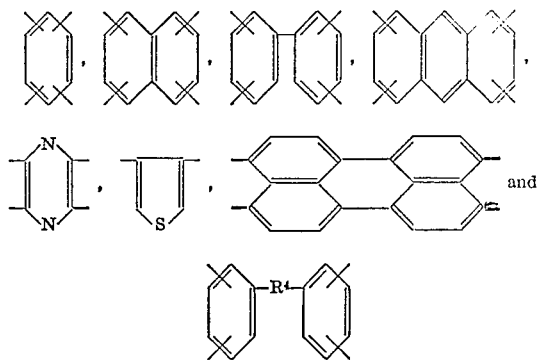

where R⁴ is defined as above.

Substituents on the above divalent and tetravalent radicals, i.e., replacements for hydrogen in aromatic C—H groups, may be alkyl of up to 18 carbon atoms such as methyl, ethyl, isopropyl, butyl, *tert*-butyl, hexyl, and octadecyl, phenyl, halogen such as fluorine, chlorine, bromine and iodine, lower alkoxy, carboxyl, lower alkoxycarbonyl, carbacyl of up to 6 carbon atoms such as acetyl and hexanoyl, sulfo and sulfo salt of an alkali or alkaline earth metal. Preferred embodiments of R, R¹, R², and R³ are those in which the aromatic portions are the benzene or naphthalene series.

Additional dianhydride radicals are listed in Table I. Suitable polyimides for use in this invention can be obtained when equivalent amounts of the dianhydrides shown in Table I are substituted, e.g., for 3,4,3',4'-diphenylhexafluoroisopropylidene tetracarboxylic dianhydride in the procedure of Example 4, Part A.

Additional diamines are listed in Table II. Suitable polyimides can be obtained when equivalent amounts of the diamines shown in Table II are substituted, e.g., for 1,5-diaminonaphthalene in the procedure of Example 10, Part A.

Polyesters suitable for use in this invention are obtained when, as in the procedure of Example 21, Part A, 4,4' - diphenylbis(trifluoromethyl)methane dicarboxylic acid dichloride is substituted, e.g., for isophthaloyl chloride and the diols shown in Table III are substituted, e.g., for 2,2-bis(3,5-dichloro-4-hydroxyphenyl)propane.

Additional suitable polyesters are obtained when equivalent amounts of the diacid chlorides of the dicarboxylic acids shown in Table IV are substituted, e.g., for isophthaloyl chloride in the procedure of Example 21, Part A.

Additional suitable polyamides are obtained when equivalent amounts of the diacid chlorides of the dicarboxylic acids shown in Table IV are substituted for isophthaloyl chloride in the procedure of Example 22, Part A, or when diphenylbis(trifluoromethyl)methane-4,4'-dicarboxylic acid dichloride is substituted for isophthaloyl chloride and equivalent amounts of the diamines shown in Table II are substituted for 4-isopropylmetaphenylenediamine in the procedure of Example 22, Part. A.

A preferred group of polyesters and polyamides are copolyesters and copolyamides formed by reacting a glycol or a diamine with an equivalent amount of a mixture of isophthaloyl and terephthaloyl chlorides where the molar and weight proportions of the acid chlorides may vary from 99/1 to 1/99, respectively. Particularly preferred are copolyesters and copolyamides in which isophthaloyl chloride is used in excess of terephthaloyl chloride, especially where the ratio is 70/30.

TABLE I

| | Dianhydrides | R₁ |
|---|---|---|
| 1 | Pyromellitic dianhydride | |
| 2 | 3,4,3',4'-diphenylsulfonetetracarboxylic dianhydride | |
| 3 | 3,4,3',4'-benzophenonetetracarboxylic dianhydride | |
| 4 | Pyrazinetetracarboxylic dianhydride | |
| 5 | 3,4,3'-4'-diphenyldimethylmethanetetracarboxylic dianhydride | |
| 6 | 3,4,3',4'-diphenyldi(trifluoromethyl)methanetetracarboxylic dianhydride | |
| 7 | 2,3,6,7-naphthalenetetracarboxylic dianhydride | |
| 8 | 3,4,3',4'-diphenyltetracarboxylic dianhydride | |
| 9 | 3,4,9,10-perylenetetracarboxylic dianhydride | |
| 10 | 3,4,3',4'-diphenylethertetracarboxylic dianhydride | |
| 11 | 1,2,4,5-naphthalenetetracarboxylic dianhydride | |
| 12 | 1,4,5,8-naphthalenetetracarboxylic dianhydride | |

TABLE I—Continued

| Dianhydrides | R₁ |
|---|---|
| 13.... 1,8,9,10-phenanthrenetetra-carboxylic dianhydride. | (phenanthrene structure) |
| 14.... 3,4,3',4'-diphenylmethane-tetracarboxylic dianhydride. | —C₆H₄—CH₂—C₆H₄— |
| 15.... 2,3,4,5-thiophenetetracarboxylic dianhydride. | (thiophene structure) |

Preferred dianhydrides are items 1, 6, and 10 of Table I.

TABLE II

| Diamine | R |
|---|---|
| 1...... 4,4'-diaminodiphenyl ether | —C₆H₄—O—C₆H₄— |
| 2...... 4,4'-diaminodiphenyl sulfone | —C₆H₄—SO₂—C₆H₄— |
| 3...... 4,4'-diaminodiphenylbis(trifluoromethyl)methane. | —C₆H₄—C(CF₃)₂—C₆H₄— |
| 4...... Lithium 2,4-diaminobenzene sulfonate. | (benzene with SO₃⁻ Li⁺) |
| 5...... m-Phenylenediamine | (m-phenylene) |
| 6...... p-Phenylenediamine | —C₆H₄— |
| 7...... 4,4'-diaminodiphenylpropane | —C₆H₄—C(CH₃)₂—C₆H₄— |
| 8...... 2,4-diaminotoluene | (toluene-2,4-diyl)—CH₃ |
| 9...... 4,4'-diaminodiphenylmethane | —C₆H₄—CH₂—C₆H₄— |
| 10...... 4,4'-diaminodiphenyl sulfide | —C₆H₄—S—C₆H₄— |
| 11...... 2,6-diaminopyridine | (pyridine-2,6-diyl) |
| 12...... Bis(4-aminophenyl)diethylsilane | —C₆H₄—Si(C₂H₅)₂—C₆H₄— |
| 13...... Bis(4-aminophenyl)diphenylsilane | —C₆H₄—Si(C₆H₅)₂—C₆H₄— |
| 14...... Benzidine | —C₆H₄—C₆H₄— |

TABLE II—Continued

| | Diamine | R |
|---|---|---|
| 15 | 3,3'-dimethoxybenzidine | 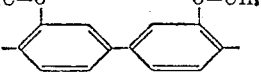 |
| 16 | Bis(4-aminophenyl)ethylphosphine oxide. | 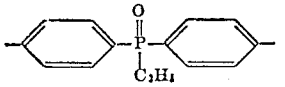 |
| 17 | Bis(4-aminophenyl)butylamine | 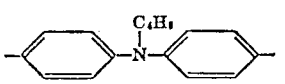 |
| 18 | Bis(4-aminophenyl)methylamine | 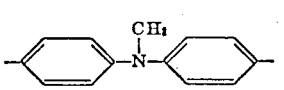 |
| 19 | 1,5-diaminonaphthalene | 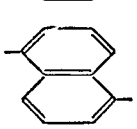 |
| 20 | 3,3'-dimethyl-4,4'-diaminobiphenyl |  |
| 21 | N-(3-aminophenyl)-4-aminobenzamide. | 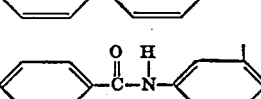 |
| 22 | 4-aminophenyl-3-aminobenzoate | 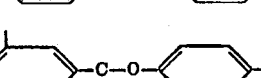 |
| 23 | N,N-bis(4-aminophenyl)aniline | 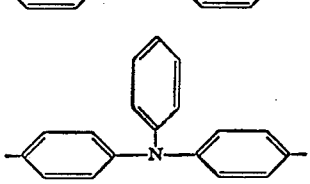 |
| 24 | 2,6-diaminotoluene |  |
| 25 | Calcium sulfometaphenylene diamine. | 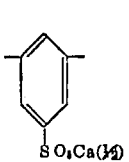 |
| 26 | 4,6-dichlorometaphenylenediamine | 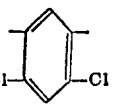 |
| 27 | 2,4,6-trichlorometaphenylenediamine. | 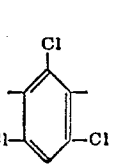 |
| 28 | 4,4'-diaminotriphenylmethane | 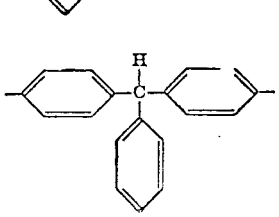 |

TABLE II—Continued

| Diamine | R |
|---|---|
| 29. Bis(4-amino-2,5-diethoxyphenyl)phenylmethane. | (structure: diphenylmethane with C₂H₅O groups at 2,5 positions on each ring and a phenyl on the central C) |
| 30. 4-isopropylmetaphenylenediamine | (structure: phenyl with –CH(CH₃)₂) |
| 31. 2,5,2',5'-tetrachlorobenzidine | (structure: biphenyl with Cl at 2,5,2',5' positions) |
| 32. 2,6-dichloro-p-phenylenediamine | (structure: phenyl with two Cl) |
| 33. 3,3'-dichlorobenzidine | (structure: biphenyl with Cl at 3,3') |
| 34. 2,2'-diaminodiphenylmethane | (structure: diphenylmethane) |
| 35. 2,2'-diamino-3,5,6-trichlorodiphenylmethane. | (structure: diphenylmethane with three Cl) |
| 36. 2,2-bis(4-aminophenyl)-1,3-diphenylpropane. | (structure: central C with two CH₂-phenyl groups and two aminophenyl groups) |

Preferred diamines are items 1–3, 5–10, 14, 15, 19, 20 and 30 of Table II.

TABLE III

Diols (1) 4,4'-Dihydroxydiphenyl ether
(2) 4,4'-Dihydroxydiphenyl sulfone
(3) 4,4'-Dihydroxydiphenylbis(trifluoromethyl)methane
(4) Lithium 2,4-dihydroxybenzenesulfonate
(5) Resorcinol
(6) Hydroquinone
(7) 2,2-Bis(4,4'-dihydroxydiphenyl)propane
(8) 2,4-Dihydroxytoluene
(9) 4,4'-Dihydroxydiphenylmethane
(10) 4,4'-Dihydroxydiphenyl sulfide
(11) 2,6-Dihydroxypyridine
(12) Bis(4-hydroxyphenyl)diethylsilane
(13) Bis(4-hydroxyphenyl)diphenylsilane
(14) 4,4'-Dihydroxybiphenyl
(15) 4,4'-Dihydroxy-3,3'-dimethoxybiphenyl

TABLE III—Continued

(16) Bis(4-hydroxyphenyl)ethylphosphine oxide
(17) Bis(4-hydroxyphenyl)butylamine
(18) Bis(4-hydroxyphenyl)methylamine
(19) 1,5-Dihydroxynaphthalene
(20) 4,4'-Dihydroxy-3,3'-dimethylbiphenyl
(21) N-(3-Hydroxyphenyl)-4-hydroxybenzamide
(22) 4-Hydroxyphenyl-3-hydroxybenzoate
(23) N,N-Bis(4-hydroxyphenyl)aniline
(24) 2,2-Bis(3-chloro-4-hydroxyphenyl)propane
(25) 2,2-Bis(3,5-dibromo-4-hydroxyphenyl)propane
(26) Bis(4-hydroxyphenyl)isononylmethane
(27) 2,2-Bis(3,5-diisopropyl-4-hydroxyphenyl)decane
(28) 2,2-Bis(4-hydroxyphenyl)isopentane
(29) 4,4-Bis(3,5-dichloro-4-hydroxyphenyl)heptane
(30) 2,2-Bis(3,5-dibromo-4-hydroxyphenyl)decane
(31) Bis(3,5-Dibromo-4-hydroxyphenyl)ether
(32) Bis(3-chloro-5-methyl-4-hydroxyphenyl)ether
(33) 3,3'-Diethyl-4,4'-dihydroxydiphenyl
(34) 3,5,3',5'-Tetrabromo-4,4'-dihydroxydiphenyl
(35) Bis(3,5-dibromo-4-hydroxyphenyl)sulfone TABLE III—Continued

(36) Bis(3,5-diisopropyl-4-hydroxyphenyl)sulfone
(37) 1,4-Dihydroxy-2,3-dichlorobenzene
(38) 1,4-Dihydroxy-2-bromo-3-propylbenzene
(39) 2,3-Bis(p-hydroxyphenyl)pentane
(40) 2,2-Bis(3-methyl-5-t-butyl-4-hydroxyphenyl) propane
(41) 2,2-Bis(4-hydroxyphenyl)-3-cyclohexylpropane
(42) 2,4-Bis(p-hydroxyphenyl)heptane
(43) 2,2-Bis(3-cyclohexyl-4-hydroxyphenyl)propane
(44) Bis(3-t-Butyl-4-hydroxyphenyl)sulfone
(45) 2,2-Bis(3-phenyl-4-hydroxyphenyl)propane
(46) 1,1-Bis(4-hydroxyphenyl)-5-phenylpentane
(47) Bis(2-hydroxyphenyl)methane
(48) 2,2'-Dihydroxy-3,5,6-trichlorodiphenylmethane
(49) 2,2-Bis(4-hydroxyphenyl)-1,3-diphenylpropane
(50) 2,2-Bis(3,5-dichloro-4-hydroxyphenyl) hexafluoropropane Preferred diols are items 1–3, 5–10, 19, 24, 25, 31 and 50 of Table III.

TABLE IV
Dicarboxylic Acids (1) Diphenyl ether 4,4'-dicarboxylic acid
(2) Diphenyl sulfone 4,4'-dicarboxylic acid
(3) Diphenylbis(trifluoromethyl)methane-4,4'-dicarboxylic acid
(4) Isophthalic acid
(5) Terephthalic acid
(6) 4,4'-Propylidenedibenzoic acid
(7) 4-Methylisophthalic acid
(8) 4,4'-Methylenedibenzoic acid
(9) Diphenyl sulfide 4,4'-dicarboxylic acid
(10) 2,6-Pyridinedicarboxylic acid
(11) 4,4'-Diethylsilanedibenzoic acid
(12) 4,4'-Diphenylsilanedibenzoic acid
(13) 4,4'-Bisbenzoic acid
(14) 4,4'-Bisanisic acid
(15) Bis(4-carboxyphenyl)ethylphosphine oxide
(16) 1,5-Naphthalenedicarboxylic acid
(17) 4,4'-Bis(o-toluic) acid
(18) 4-Bromoisophthalic acid Preferred dicarboxylic acids are items 1–6, 13 and 16 of Table IV.

SPECIFIC EMBODIMENTS OF THE INVENTION

In the illustrative examples which follow, parts and percentages are by weight unless otherwise specified.

EXAMPLE 1

Part A.—Polyimide from 3,4,3',4'-diphenylhexafluoroisopropylidene tetracarboxylic dianhydride and 4,4'-diaminodiphenyl ether To a solution of 40.05 g. of 4,4'-diaminodiphenyl ether in 350 ml. of dry pyridine under nitrogen at 50° C. was added 88.87 g. of 3,4,3',4'-diphenylhexafluoroisopropylidene tetracarboxylic dianhydride. The temperature rose to a peak of 74° C. within a few minutes. After 1 hour of stirring, 82 g. of acetic anhydride was added. The temperature rose to a peak of 66° C. within a few minutes. Stirring was continued for 3 hours, during the latter portion of which the solution was heated to 100° C. After cooling the solution to room temperature, the polyimide was precipitated by drowning in a large excess of methanol under vigorous agitation, recovered by filtration, washed with methanol and dried under vacuum, first for 4 hours at 170° C. and then for 3 hours at 260° C.

The polyimide prepared as shown above was checked against requirements (a), (b) and (c) as follows:

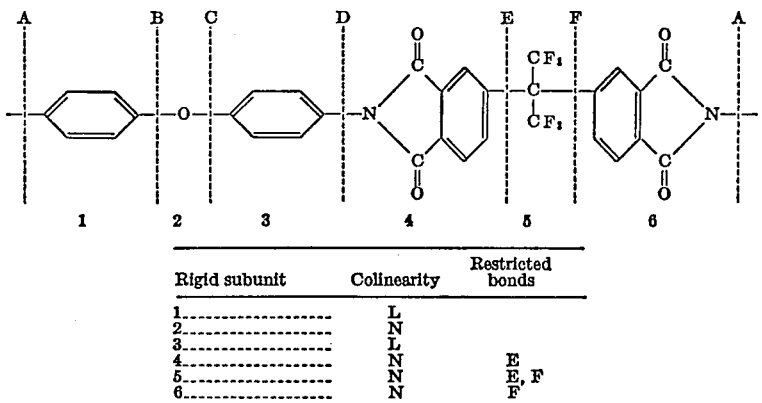

| Rigid subunit | Colinearity | Restricted bonds |
|---|---|---|
| 1 | L | |
| 2 | N | |
| 3 | L | |
| 4 | N | E |
| 5 | N | E, F |
| 6 | N | F |

The repeating unit has 4 N and 2 L subunits, 2 bonds with restricted rotation, 3 of the N subunits have at least one bond with restricted rotation, 24/32 of the atoms in the chain are aromatic.

Part B

A solution of 30 g. of the polyimide of Part A and 170 g. of dichloromethane was filtered through a 0.45μ silver membrane, degassed and two films were cast on an Inconel sheet coated with a low molecular weight polytetrafluoroethylene wax dispersion (Vydax®) at room temperature in a dust-free cabinet with a 15-mil doctor knife. The films were dried for 15 minutes and then stripped. One film was air-dried and used as a control. The other film was placed in a vacuum chamber and heat-treated at 260° C. for 6 hours under a vacuum of 2 microns. The control film, 1.42 mils thick, permeated $H_2$ at 3197 GTR and 2724 cB and $CH_4$ at 106 GTR and 90 cB. The $S_{H_2/CH_4}$ was 30. The heat-treated film, 1.97 mils thick, permeated $H_2$ at 2907 GTR and 3436 cB and $CH_4$ at 14 GTR and 17 cB. The $S_{H_2/CH_4}$ was 208. The heat treatment produced almost a seven-fold increase in the selectivity of the membrane with reference to hydrogen and methane.

EXAMPLE 2

A solution containing about 15 to 20% of the polyimide of Example 1, Part A, in dimethylacetamide was used to cast a series of films on Vydax® coated glass at 100° C. using a 25-mil doctor knife. The films were covered and dried for 5 minutes at 100° C. Vents in the cover were then opened and the films were further dried for 10 minutes at 100° C. The films were then stripped from the plate. A control film was air-dried at room temperature while the remaining other films were heat-treated for 6 hours under a vacuum of 2μ at the respective temperatures shown in Table V. All films were then tested for permeation of hydrogen and methane with the results shown in Table V.

TABLE V

| Thickness (mils) | Post treatment temperature (° C.) | H₂ permeation GTR | H₂ permeation cB | CH₄ permeation GTR | CH₄ permeation cB | Selectivity, H₂/CH₄ |
| --- | --- | --- | --- | --- | --- | --- |
| 1.78 | Control | 2,458 | 2,625 | 45 | 48 | 55 |
| 1.60 | 200 | 3,632 | 3,487 | 25 | 24 | 145 |
| 1.63 | 210 | 3,654 | 3,574 | 24 | 24 | 152 |
| 1.71 | 220 | 3,772 | 3,870 | 20 | 20 | 189 |
| 1.67 | 230 | 3,510 | 3,517 | 18 | 18 | 195 |
| 2.69 | 240 | 2,505 | 4,043 | 14 | 23 | 177 |
| 2.57 | 250 | 2,691 | 4,150 | 13 | 20 | 207 |
| 2.62 | 260 | 2,287 | 3,595 | 9 | 14 | 254 |
| 1.91 | 270 | 3,164 | 3,626 | 18 | 21 | 176 |
| 2.62 | 280 | 2,145 | 3,372 | 10 | 16 | 215 |
| 2.86 | 290 | 2,277 | 3,907 | 9 | 16 | 253 |
| 2.67 | 300 | 2,434 | 3,899 | 12 | 19 | 203 |
| 1.95 | 310 | 3,690 | 4,317 | 20 | 24 | 185 |
| 1.65 | 320 | 3,995 | 3,955 | 25 | 25 | 160 |
| 2.00 | 330 | 3,650 | 4,380 | 14 | 17 | 261 |
| 1.72 | 340 | 3,910 | 4,035 | 22 | 23 | 178 |

EXAMPLE 3

A solution of 20 g. of the polyimide of Example 1, Part A, in 80 g. of dimethylacetamide was filtered through a 0.8μ silver membrane, degassed, and two films were cast on a Vydax® coated glass plate at 100° C. with a 25-mil doctor knife. The films were covered, dried at 100° C. for 5 minutes, after which the vents on the cover were opened and drying continued for 10 minutes. The films were then stripped from the plate. One film was air-dried and used as a control while the other was heat-treated under a 2μ vacuum for 6 hours at 260° C. The control film, 2.60 mils thick, permeated $H_2$ at 1378 GTR and 2150 cB and $CH_4$ at 47 GTR and 73 cB. The $S_{H_2/CH_4}$ was 29. The heat-treated film, 2.62 mils thick, permeated $H_2$ at 2286 GTR and 3594 cB and $CH_4$ at 14 GTR and 22 cB. The $S_{H_2/CH_4}$ was 163.

EXAMPLE 4

Part A.—Polyimide from 3,4,3′,4′-diphenylhexafluoroisopropylidene tetracarboxylic dianhydride and 4-isopropyl-1,3-diaminobenzene To a solution of 31.21 g. of 4-isopropyl-1,3-diaminobenzene in 350 ml. of dry pyridine under nitrogen at 50° C. was added with stirring 92.29 g. of 3,4,3′,4′-diphenylhexafluoroisopropylidene tetracarboxylic dianhydride, rinsed in with an added 50 ml. of pyridine. Within a few minutes the temperature rose to a peak of 76° C. After stirring for about two hours, the temperature was 52° C. and 85.2 g. of acetic anhydride was added. Within a few minutes the temperature rose to a peak of 66° C. After 1 hour of stirring, the solution was heated to 99° C. and stirred for about 20 minutes. The polyimide was precipitated from the cooled solution by drowning it in a large excess of methanol under vigorous agitation. The polyimide was recovered by filtration, washed three times with methanol and dried under vacuum, first for 4 hours at 100° C. and then for 4 hours at 260° C.

The polyimide prepared as shown above was checked against requirements (a), (b) and (c) as follows:

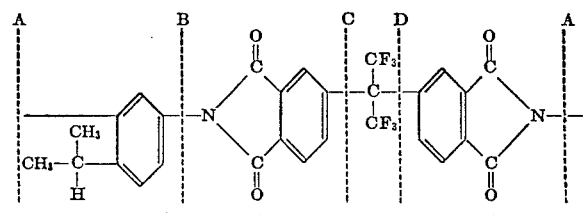

| Rigid subunit | Colinearity | Restricted bonds |
| --- | --- | --- |
| 1 | N | A |
| 2 | N | C |
| 3 | N | C, D |
| 4 | N | A |

The repeating unit has 4 N subunits, 3 restricted bonds, all of the N subunits have at least one bond with restricted rotation, 18/25 of the chain atoms are aromatic.

Part B

A solution of 42.5 g. of the polyimide of Part A in 170 g. of dimethylacetamide was filtered through a 0.45μ silver membrane, degassed and two films were cast on a Vydax® coated glass plate at 100° C. using a 15-mil doctor knife. The films were then covered and allowed to dry for 5 minutes, after which the vents in the cover were opened and films allowed to dry another 10 minutes. The films were stripped from the plate. One film was air-dried for use as a control. Another film was placed in a vacuum chamber and heat-treated at 260° C. under a vacuum of 2μ for 6 hours. The 1.79-mil thick control film permeated $H_2$ at 11,150 GTR and 11,975 cB and $CH_4$ at 851 GTR and 914 cB. The $S_{H_2/CH_4}$ was 13. The 2.01-mil thick heat-treated film permeated $H_2$ at 11,407 GTR and 13,757 cB and $CH_4$ at 130 GTR and 157 cB. The $S_{H_2/CH_4}$ was 88.

EXAMPLE 5

Part A.—Polyimide from 3,4,3′,4′-diphenylhexafluoroisopropylidene tetracarboxylic dianhydride and meta-phenylenediamine To a solution of 10.81 g. of metaphenylenediamine in 175 ml. of dry N,N-dimethylacetamide under nitrogen at 50° C. was added with stirring 44.43 g. of 3,4,3′,4′-diphenylhexafluoroisopropylidene tetracarboxylic dianhydride, rinsed in with an added 25 ml. of dimethylacetamide. Within 2 minutes the temperature rose to a peak of 66° C. Stirring was continued for more than an hour. With the solution at 45° C. a mixture of 82 g. of triethylamine and 82 g. of acetic anhydride was stirred in. Within 10 minutes the temperature rose to a peak of 52° C. and then began to drop. Stirring was continued for about 2 hours. The resulting polyimide solution in dimethylacetamide was concentrated to 32% by evaporation, diluted to 10% by adding 359 g. additional dimethylacetamide and then concentrated to about 15% polyimide by evaporation and used without further treatment.

The polyimide prepared as shown above was checked against requirements (a), (b) and (c) as follows:

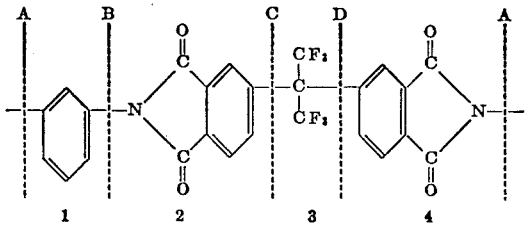

| Rigid subunit | Colinearity | Restricted bonds |
| --- | --- | --- |
| 1 | N | |
| 2 | N | C |
| 3 | N | C, D |
| 4 | N | D |

Repeating unit has 4 N subunits, 2 bonds with restricted rotation, 3 of the N subunits have at least 1 bond with restricted rotation, and 18/25 of the atoms in the chain are aromatic.

Part B

The 15% solution of the polyimide in dimethylacetamide from Part A was filtered, degassed, and two films were cast on a Vydax® coated glass plate at 100° C. with a 25-mil doctor knife. The films were covered and allowed to dry for 5 minutes at 100° C. The vents in the cover were then opened and drying was continued for 10 minutes. The films were stripped from the plate. One film was air-dried and used as a control. Another film was placed in a vacuum chamber and heat-treated at 260° C. for 6 hours under a vacuum of 2μ. The 1.61-mil control film permeated $H_2$ at 3054 GTR and 2950 cB and $CH_4$ at 70 GTR and 68 cB. The $S_{H_2/CH_4}$ was 44. The 1.27-mil heat-treated film permeated $H_2$ at 4610 GTR and 3513 cB and $CH_4$ at 14 GTR and 11 cB. The $S_{H_2/CH_4}$ was 329.

EXAMPLE 6

Part A.—Polyimide from 3,4,3',4'-diphenylhexafluoroisopropylidene tetracarboxylic dianhydride and p-phenylenediamine To a solution of 21.63 g. of p-phenylenediamine in 350 ml. of N,N-dimethylacetamide at 50° C. under nitrogen was added with stirring 88.87 g. of 3,4,3',4'-diphenylhexafluoroisopropylidene tetracarboxylic dianhydride. Within 5 minutes the temperature rose to a peak of 77° C. Stirring was continued for about one hour, at which time 82 g. of triethylamine and 82 g. of acetic anhydride were added. Stirring was continued for about 2 hours. The polyimide was precipitated by drowning the solution in a large excess of methanol under vigorous agitation. The polyimide was recovered by filtration, washed twice with methanol and dried under vacuum, first for 16 hours at room temperature and then for 3 hours at 260° C.

The polyimide prepared as shown above was checked against requirements (a), (b) and (c) as follows:

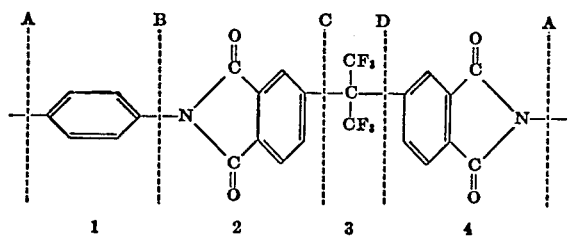

| Rigid subunit | Colinearity | Restricted bonds |
|---|---|---|
| 1 | L | |
| 2 | N | C |
| 3 | N | C, D |
| 4 | N | D |

Repeating unit has one L and 3 N subunits, 2 restricted bonds, all of the N subunits have at least one bond with restricted rotation, and $^{18}\!/_{25}$ of the atoms in the chain are aromatic.

Part B

A solution of 45 g. of a polyimide like the one in Part A in 255 g. of dimethylacetamide was filtered through a 0.45μ silver membrane, degassed, and two films were cast on Vydax® coated glass plate at 100° C. with a 25-mil doctor knife. The films were covered and dried for 5 minutes. The vents in the cover were then opened and drying continued for 10 minutes. The films were stripped from the plate. One film was air-dried and used as a control. Another film was placed in a vacuum chamber and heat-treated at 260° C. for 6 hours under a vacuum of 2μ. The 1.3-mil control film permeated $H_2$ at 3680 GTR and 2870 cB and $CH_4$ at 66 GTR and 51 cB. The $S_{H_2/CH_4}$ was 56. The 1.2-mil heat-treated film permeated $H_2$ at 5586 GTR and 4022 cB and $CH_4$ at 29 GTR and 21 cB. The $S_{H_2/CH_4}$ was 193.

EXAMPLE 7

Part A.—Polyimide from 3,4,3',4'-diphenylhexafluoroisopropylidene tetracarboxylic dianhydride and the bisamide from m-phenylenediamine and m-aminobenzoic acid To a solution of 34.64 g. of N,N'-m-phenylenebis(m-aminobenzamide) in 175 ml. of dry N,N-dimethylacetamide under nitrogen at 50° C. was added with stirring 44.44 g. of 3,4,3',4'-diphenylhexafluoroisopropylidene tetracarboxylic dianhydride, rinsed in with an added 25 ml. of dimethylacetamide. Within a few minutes the temperature peaked at 76.5° C. and began to drop. After stirring for about 1 hour, 41 g. of triethylamine and 41 g. of acetic anhydride were added. The temperature soon peaked at 66° C. and began to drop. After stirring for 2 hours, the polyimide was precipitated by drowning the solution in excess methanol under vigorous agitation. The polyimide was recovered by filtration, washed twice with methanol and dried under vacuum, first for about 18 hours at room temperature and then for 3 hours at 260° C.

The polyimide prepared as shown above was checked against requirements (a), (b) and (c) as follows:

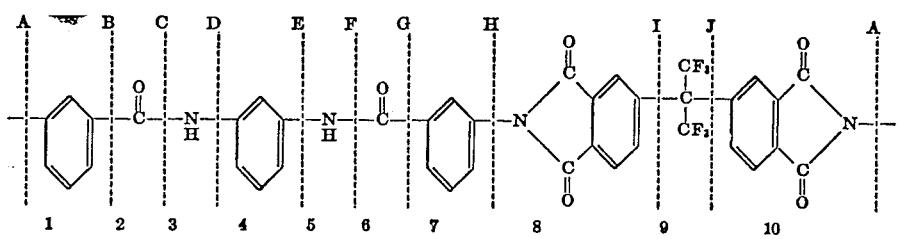

| Rigid subunit | Colinearity | Restricted bonds |
|---|---|---|
| 1 | N | |
| 2 | N | |
| 3 | N | |
| 4 | N | |
| 5 | N | |
| 6 | N | |
| 7 | N | |
| 8 | N | I |
| 9 | N | I, J |
| 10 | N | J |

The repeating unit has 10 N subunits, two bonds with restricted rotation, three of the N subunits have at least one bond with restricted rotation, and 30/41 of the atoms in the chain are aromatic.

Part B

A solution of 12 g. of the polyimide of Part A in 68 g. of dimethylacetamide was filtered through 0.45μ silver membrane, degassed, and two films were cast on a Vydax® coated glass plate at 100° C. with a 25-mil doctor knife. The films were covered and dried for 5 minutes. The vents in the cover were then opened and drying continued for 10 minutes. The films were stripped from the plate. One film was air-dried and used as a control. Another film was heat-treated for 6 hours under a vacuum of 2μ. Heating was started at 100° C. and after 1 hour had reached 260° C. where it was held for the remainder of the treatment. The 1.62-mil control film permeated $H_2$ at 1268 GTR and 1232 cB and $CH_4$ at 24 GTR and 23 cB. The $S_{H_2/CH_4}$ was 53. The 1.48-mil heat-treated film permeated $H_2$ at 1360 GTR and 1208 cB and $CH_4$ at 1.5 GTR and 1.3 cB. The $S_{H_2/CH_4}$ was 907.

EXAMPLE 8

Part A.—Polyimide from 3,4,3',4'-diphenylhexafluoroisopropylidene tetracarboxylic dianhydride and 3,5-diaminobenzoic acid To a solution of 15.22 g. of 3,5-diaminobenzoic acid in 175 ml. of dry N,N-dimethylacetamide under nitrogen at 50° C. was added with stirring 44.44 g. of 3,4,3',4'-diphenylhexafluoroisopropylidene tetracarboxylic dianhydride, rinsed in with an added 25 ml. of dimethylacetamide. Within 2 minutes the temperature peaked at 74.5° C. and began to drop. After about 1 hour of stirring, 82 g. of triethylamine and 82 g. of acetic anhydride were added. Within 14 minutes the temperature peaked at 56° C. and began to drop. After stirring for 2 hours the solution was concentrated to 25% polyimide in dimethylacetamide by evaporation under vacuum first at 50° C. and then at 100° C. It was then diluted to 10% polyimide by adding 332 g. of dimethylacetamide, followed by concentrating to 15% polyimide by evaporation and filtering through a 0.45μ silver membrane.

The polyimide prepared as shown above was checked against requirements (a), (b) and (c) as follows:

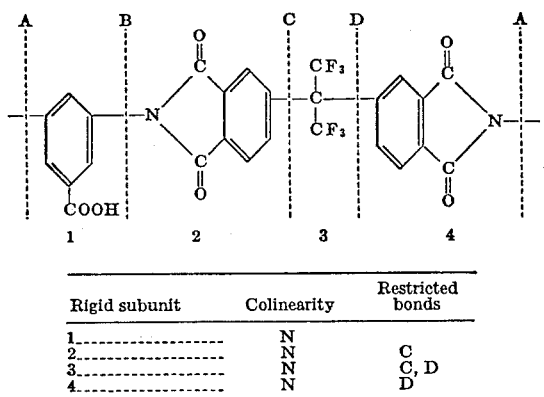

| Rigid subunit | Colinearity | Restricted bonds |
|---|---|---|
| 1 | N | |
| 2 | N | C |
| 3 | N | C, D |
| 4 | N | D |

The repeating unit has 4 N subunits, 2 bonds with restricted rotation, 3 of the N subunits have at least one bond with restricted rotation, and 18/27 of the atoms in the chain are aromatic.

Part B

To 20 g. of the polyimide solution from Part A was added 0.17 g. of ethylene glycol. The solution obtained was degassed and two films were cast on a Vydax® coated glass plate at 100° C. with a 25-mil doctor knife. The films were covered, dried for 5 minutes, after which the vents in the cover were opened and drying was continued for 10 minutes. The films were stripped from the plate. One film was air-dried and used as a control. The 1.31-mil control film permeated $H_2$ at 2684 GTR and 2110 cB and $CH_4$ at 29 GTR and 23 cB. The $S_{H_2/CH_4}$ was 93.

Part C

The second film from Part B was heat-treated at 260° for 6 hours under vacuum of 2μ. During this heat treatment the pendant carboxyl groups in the diamine reacted with ethylene glycol to form crosslinks. This was shown on a portion of the film which dissolved readily in dimethylacetamide before the heat treatment, whereas the heat-treated film was insoluble in dimethylacetamide. The crosslinked polyimide of the heat-treated film was checked against requirements (a), (b) and (c) as follows:

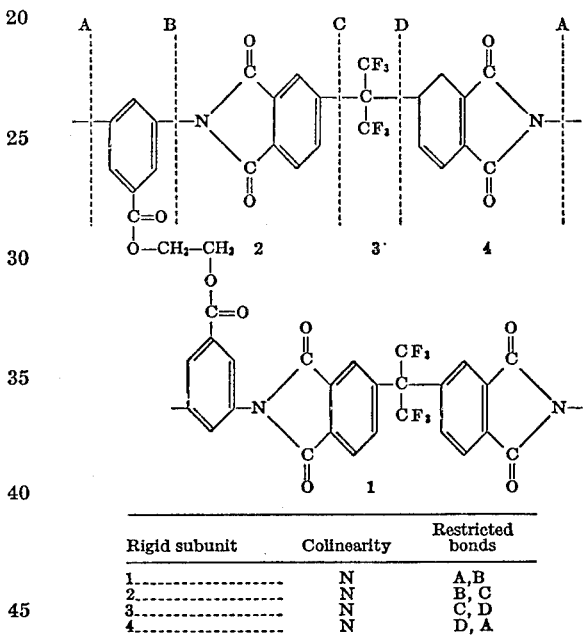

| Rigid subunit | Colinearity | Restricted bonds |
|---|---|---|
| 1 | N | A, B |
| 2 | N | B, C |
| 3 | N | C, D |
| 4 | N | D, A |

The crosslinked polyimide has 4 N subunits, 4 bonds with restricted rotation, all of the N subunits have at least one bond with restricted rotation, and 18/27 of the atoms in the main chain are aromatic. The clear, smooth, crisp, 1.38-mil crosslinked film are permeated $H_2$ at 4732 GTR and 3918 cB and CH at 11 GTR and 9 cB. The $S_{H_2/CH_4}$ was 430.

EXAMPLE 9

Part A.—Polyimide from 3,4,3',4'-diphenylhexafluoroisopropylidene tetracarboxylic dianhydride and 3,3'-diaminobenzanilide To a solution of 15.05 g. of 3,3'-diaminobenzanilide in 120 ml. of N,N-dimethylacetamide under nitrogen at 50° C. was added with stirring 29.68 g. of 3,4,3',4'-diphenylhexafluoroisopropylidene tetracarboxylic dianhydride. Within a few minutes the temperature peaked at 55° C. After about an hour of stirring, 55 g. of triethylamine and 55 g. of acetic anhydride were added. After stirring for about an hour and a half the polyimide was precipitated by drowning in a large excess of methanol under vigorous agitation. The polyimide was recovered by filtration, washed twice with methanol and dried under vacuum, first for about 16 hours at room temperature and then for 3 hours at 260° C. At 0.1% concentration in dimethylacetamide at 25° C. the polyimide had an inherent viscosity of 1.15.

The polyimide-amide prepared as shown above was checked against requirements (a), (b) and (c) as follows:

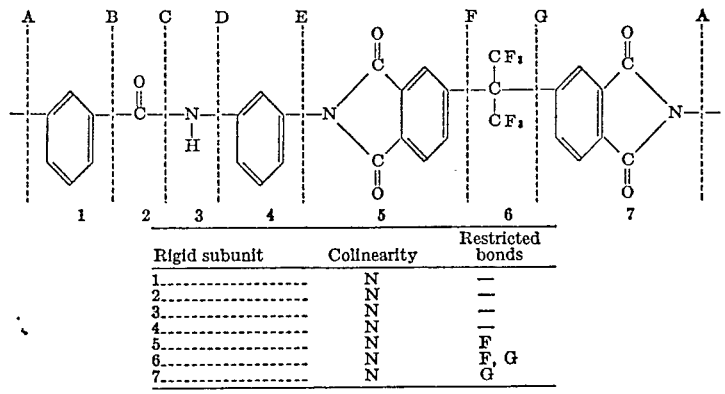

| Rigid subunit | Colinearity | Restricted bonds |
|---|---|---|
| 1 | N | — |
| 2 | N | — |
| 3 | N | — |
| 4 | N | — |
| 5 | N | F |
| 6 | N | F, G |
| 7 | N | G |

The repeating unit has 7 N subunits, 2 bonds with restricted rotation, 3 of the N subunits have at least one bond with restricted rotation, and 24/33 of the atoms in the chain are aromatic.

Part B

A solution of 15 g. of the polyimide-amide of Part A in 85 g. of dimethylacetamide was filtered through a 0.45μ silver membrane, degassed, and two films were cast on a Vydax® coated glass plate at 100° C. with a 25-mil doctor knife. The films were covered, dried for 5 minutes, after which the vents in the cover were opened and drying was continued for 10 minutes. The films were stripped from the plate. One film was air-dried and used as a control. Another film was heat-treated at 260° C. for 6 hours under a vacuum of 2μ. The 1.56-mil control film permeated $H_2$ at 1328 GTR and 1243 cB and $CH_4$ at 16 GTR and 15 cB. The $S_{H_2/CH_4}$ was 83. The 1.42-mil heat-treated film permeated $H_2$ at 2404 GTR and 2048 cB and $CH_4$ at 2.9 GTR and 2.5 cB. The $S_{H_2/CH_4}$ was 829.

EXAMPLE 10

Part A.—Polyimide from 3,4,3',4'-diphenylhexafluoroisopropylidene tetracarboxylic dianhydride and 1,5-diaminonaphthalene To a solution of 31.64 g. of 1,5-diaminonaphthalene in 350 ml. of N,N-dimethylacetamide under nitrogen was added 88.87 g. of 3,4,3',4'-diphenylhexafluoroisopropylidene tetracarboxylic dianhydride. The mixture was heated to 69° C. and stirred for one hour. Then a mixture of 82 g. of acetic anhydride and 82 g. of triethylamine was added in small portions over a period of about 10 minutes, starting with the solution at 53° C. Within a few minutes of stirring a peak temperature of 60.5° C. was reached. Stirring was continued for 1 hour as the temperature gradually dropped. The resulting solution was drowned in a large excess of methanol under vigorous agitation. The precipitated polyimide was recovered by filtration, washed with methanol and dried under vacuum, first at room temperature for about 16 hours and then for 3 hours at 260° C.

The polyimide prepared as shown above was checked against requirements (a), (b) and (c) as follows:

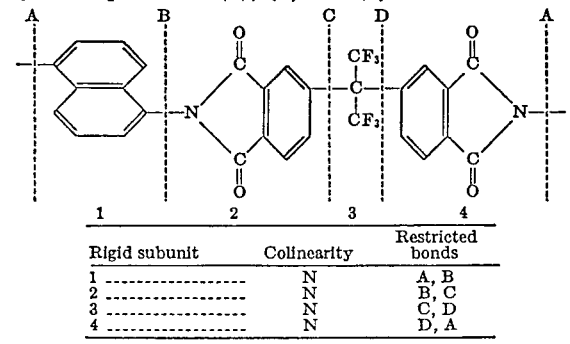

| Rigid subunit | Colinearity | Restricted bonds |
|---|---|---|
| 1 | N | A, B |
| 2 | N | B, C |
| 3 | N | C, D |
| 4 | N | D, A |

The repeating unit contains 4 N subunits, 4 bonds with restricted rotation, all of the N subunits have at least one bond having restricted rotation, and 22/29 of the chain atoms are aromatic.

Part B

A solution of 20 g. of the polyimide of Part A in 80 g. of dimethylacetamide was filtered through a 0.8μ silver membrane, degassed, and two films were cast on a Vydax® coated glass plate at 100° C. using a 25-mil doctor knife. The films were covered, dried at 100° C. for 5 minutes with the cover vents closed and 10 minutes with the vents open. The films were then stripped from the plate. One film was air-dried and used as a control. Another film was heat-treated at 260° C. for 6 hours under a vacuum of 2μ. The 2.71-mil control film permeated $H_2$ at 3542 GTR and 5759 cB and $CH_4$ at 144 GTR and 234 cB. The $S_{H_2/CH_4}$ was 25. The 2.77 mil heat-treated film permeated $H_2$ at 6546 GTR and 10,879 cB and $CH_4$ at 35 GTR and 58 cB. The $S_{H_2/CH_4}$ was 187.

EXAMPLE 11

The film-casting procedure of Example 10, Part B, was repeated several times. The cast films were covered and dried for 5 minutes at 100° C. The cover vents were then opened and the films further dried for 10 minutes at 100° C. The films were stripped from the plate. A control film was air-dried only. The other films were heat-treated for 6 hours under a vacuum of 2μ at the respective temperature shown in Table VI. All films were then tested for permeation of hydrogen and methane with the results shown in Table VI.

TABLE VI

| Post treatment temperature (° C.) | Thickness (mils) | $H_2$ permeation GTR | $H_2$ permeation cB | $CH_4$ permeation GTR | $CH_4$ permeation cB | Selectivity, $H_2/CH_4$ |
|---|---|---|---|---|---|---|
| Control | 1.66 | 5,342 | 5,321 | 190 | 189 | 28 |
| 200 | 1.95 | 7,912 | 9,257 | 58 | 68 | 136 |
| 210 | 1.87 | 7,166 | 8,040 | 45 | 51 | 159 |
| 220 | 1.89 | 7,821 | 8,869 | 57 | 65 | 137 |
| 230 | 1.85 | 8,814 | 9,784 | 51 | 57 | 173 |
| 240 | 2.87 | 5,392 | 9,285 | 20 | 35 | 270 |
| 250 | 1.92 | 7,548 | 8,695 | 37 | 43 | 204 |
| 260 | 2.77 | 6,546 | 10,879 | 35 | 58 | 187 |
| 270 | 1.88 | 7,606 | 8,580 | 50 | 56 | 152 |
| 280 | 2.75 | 6,659 | 10,987 | 40 | 66 | 166 |
| 290 | 2.38 | 7,433 | 10,614 | 41 | 59 | 181 |
| 300 | 1.91 | 8,735 | 10,010 | 53 | 61 | 165 |
| 310 | 1.91 | 8,016 | 9,186 | 42 | 48 | 191 |
| 320 | 1.90 | 8,344 | 9,512 | 55 | 62 | 152 |
| 340 | 1.74 | 8,691 | 9,073 | 60 | 63 | 145 |

EXAMPLE 12

The film preparation of Example 11 was repeated and several films were used for testing the effect of the time of heat treatment at 260° C. on the permeation properties of the films with respect to hydrogen and methane. The results are shown in Table VII.

TABLE VII

| Post treatment time (hrs.) | Thickness (mils) | H₂ permeation | | CH₄ permeation | | Selectivity, H₂/CH₄ |
|---|---|---|---|---|---|---|
| | | GTR | cB | GTR | cB | |
| 1 | 2.72 | 5.353 | 8.736 | 38 | 61 | 141 |
| 2 | 2.63 | 5.858 | 9.244 | 40 | 63 | 146 |
| 4 | 2.66 | 6.237 | 9.954 | 30 | 47 | 208 |
| 6 | 2.77 | 6.546 | 10.879 | 35 | 58 | 187 |

EXAMPLE 13

The film preparation of Example 2 was repeated and several films were used for testing the effect of the time of heat treatment at 260° C. on the permeation properties of the films with respect to hydrogen and methane. The results are shown in Table VIII.

TABLE VIII

| Post treatment time (hrs.) | Thickness (mils) | H₂ permeation | | CH₄ permeation | | Selectivity, H₂/CH₄ |
|---|---|---|---|---|---|---|
| | | GTR | cB | GTR | cB | |
| 1 | 2.53 | 2.589 | 3.930 | 13 | 19 | 199 |
| 2 | 2.64 | 2.224 | 3.523 | 11 | 18 | 202 |
| 4 | 2.88 | 2.779 | 4.802 | 14 | 25 | 199 |
| 6 | 2.62 | 2.287 | 3.595 | 9 | 14 | 254 |

EXAMPLE 14

Part A

A series of five polymers and copolymers were prepared, the first by repeating the procedure of Example 10, Part A. The second, third, fourth and fifth were prepared by the same procedure except that 25%, 50%, 75% and 100%, respectively, of the 1,5-diaminonaphthalene (1,5-ND) was replaced by a molecular equivalent amount of 4,4'-diaminodiphenyl ether (ODA).

Part B

Two films were prepared from each of the five polyimides of Part A by preparing 20% solutions in dimethylacetamide and casting on a Vydax® coated glass plate at 100° C. with a 25-mil doctor knife. The films were covered and dried at 100° C. for 5 minutes, after which the vents on the cover were opened and drying was continued for 10 minutes. The films were then stripped from the plate. One of each pair of films was air-dried and used as a control. The other film was placed in a vacuum chamber and heat-treated at 260° C. for 6 hours under a vacuum of 2μ. The films were then tested for permeation of hydrogen and methane as shown in Table IX.

TABLE IX

| Film | Mole percent | | Thickness (mils) | H₂ permeation | | CH₄ permeation | | Selectivity, H₂/CH₄ |
|---|---|---|---|---|---|---|---|---|
| | 1,5,ND | ODA | | GTR | cB | GTR | cB | |
| Control | 100 | 0 | 2.71 | 3,542 | 5,759 | 144 | 235 | 25 |
| Heat-treated | 100 | 0 | 2.77 | 6,060 | 10,072 | 36 | 60 | 168 |
| Control | 75 | 25 | 2.70 | 3,665 | 5,937 | 116 | 188 | 32 |
| Heat-treated | 75 | 25 | 3.02 | 4,502 | 8,158 | 32 | 58 | 141 |
| Control | 50 | 50 | 2.55 | 2,754 | 4,214 | 87 | 133 | 32 |
| Heat-treated | 50 | 50 | 2.74 | 4,344 | 7,142 | 33 | 54 | 132 |
| Control | 25 | 75 | 0.95 | 6,566 | 3,743 | 129 | 73 | *51 |
| Heat-treated | 25 | 75 | 0.98 | 7,493 | 4,406 | 43 | 25 | *174 |
| Control | 0 | 100 | 1.78 | 2,458 | 2,625 | 45 | 48 | 55 |
| Heat-treated | 0 | 100 | 2.07 | 2,837 | 3,524 | 16 | 20 | 177 |

* Cast from 10% solution.

EXAMPLE 15

Part A

A copolyamide using the disclosure of U.S. 3,567,632, Richter and Hoehn, was prepared from a 70/30 mixture of isophthaloyl chloride (I) and terephthaloyl chloride (T), and a mixture of 11.5 mole percent (20 weight percent) of calcium sulfo-m-phenylenediamine (Ca SMPD) of the formula

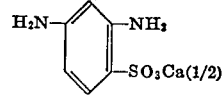

and 88.5 mole percent (80 weight percent) of m-phenylenediamine, to obtain a copolyamide.

Part B

Polyimide/polyamide blends were prepared by dissolving together in varying proportions (as shown in Table X) the polyimide of Example 1, Part A, and the polyamide of Example 15, Part A, above, the amounts of the two polymers being selected to give a total of 15% polymer weight in solution in dimethylacetamide. Two films of the resulting solutions were cast on Vydax® coated glass at 100° C. using a 25-mil doctor knife. The films were first dried for 5 minutes at 100° C. with the cover vents closed and then for 10 minutes with the vents open. The films were then stripped from the plate. The first film was air-dried and used as a control. The second film of each pair was heat-treated at 260° C. for 6 hours under a vacuum of 2μ. The films were tested for permeation of hydrogen and methane as shown in Table X.

TABLE X

| Film | Wt. percent | | Thickness (mils) | H₂ permeation | | CH₄ permeation | | Selectivity, H₂/CH₄ |
|---|---|---|---|---|---|---|---|---|
| | Polyimide | Polyamide | | GTR | cB | GTR | cB | |
| Control | 0 | 100 | 1.42 | 248 | 211 | 1.0 | 1.0 | 248 |
| Heat-treated | 0 | 100 | 1.45 | 145 | 126 | 0.3 | 0.3 | 483 |
| Control | 75 | 25 | 1.52 | 961 | 876 | 14 | 13 | 69 |
| Heat-treated | 75 | 25 | 1.49 | 1,277 | 1,142 | 3 | 3 | 426 |
| Control | 80 | 20 | 1.38 | 1,203 | 996 | 13 | 11 | 93 |
| Heat-treated | 80 | 20 | 1.54 | 1,181 | 1,091 | 3 | 3 | 394 |
| Control | 85 | 15 | 1.39 | 1,869 | 1,559 | 58 | 48 | 32 |
| Heat-treated | 85 | 15 | 1.34 | 1,975 | 1,588 | 9 | 7 | 219 |
| Control | 90 | 10 | 1.28 | 1,953 | 1,500 | 35 | 27 | 56 |
| Heat-treated | 90 | 10 | 1.31 | 2,555 | 2,008 | 13 | 11 | 197 |
| Control | 95 | 5 | 1.46 | 2,417 | 2,117 | 56 | 49 | 43 |
| Heat-treated | 95 | 5 | 1.25 | 3,885 | 2,914 | 27 | 20 | 144 |
| Control | 100 | 0 | 1.78 | 2,458 | 2,625 | 45 | 48 | 55 |
| Heat-treated | 100 | 0 | 2.07 | 2,837 | 3,524 | 16 | 20 | 177 |

EXAMPLE 16

Polyimide/polyamide blends were prepared by dissolving together in varying proportions the polyimide of Example 10, Part A, and the polyamide of Example 15, Part A. Amounts of the two polymers were selected to give a total of 15% polymer weight in solution in dimethylacetamide. Two films of the resulting solutions were cast on Vydax® coated glass at 100° C. using a 25-mil doctor knife. The films were first dried for 5 minutes at 100° C. with the cover vents closed and then for 10 minutes with the vents open. The films were stripped from the plate. One film of each pair was air-dried and used as a control. The second film was heat-treated at 260° C. for 6 hours under a vacuum of 2$\mu$. The films were then tested for permeation of hydrogen and methane as shown in Table IX.

TABLE XI

| Film | Wt. percent Polyimide | Wt. percent Polyamide | Thickness (mils) | $H_2$ permeation GTR | $H_2$ permeation cB | $CH_4$ permeation GTR | $CH_4$ permeation cB | Selectivity, $H_2/CH_4$ |
|---|---|---|---|---|---|---|---|---|
| Control | 50 | 50 | 1.39 | 1,413 | 1,178 | 48 | 40 | 29 |
| Heat-treated | 50 | 50 | 1.44 | 1,310 | 1,132 | 4 | 3 | 328 |
| Control | 75 | 25 | 1.43 | 2,819 | 2,419 | 100 | 86 | 28 |
| Heat-treated | 75 | 25 | 1.44 | 3,808 | 3,290 | 23 | 20 | 166 |
| Control | 80 | 20 | 1.47 | 3,122 | 2,754 | 136 | 120 | 23 |
| Heat-treated | 80 | 20 | 1.42 | 5,046 | 4,299 | 33 | 28 | 153 |
| Control | 85 | 15 | 1.38 | 3,840 | 3,180 | 139 | 115 | 28 |
| Heat-treated | 85 | 15 | 1.41 | 5,840 | 4,941 | 41 | 34 | 142 |
| Control | 90 | 10 | 1.44 | 4,476 | 3,867 | 195 | 168 | 23 |
| Heat-treated | 90 | 10 | 1.42 | 7,890 | 6,722 | 59 | 51 | 134 |
| Control | 95 | 5 | 1.47 | 5,224 | 4,608 | 212 | 187 | 25 |
| Heat-treated | 95 | 5 | 1.53 | 7,862 | 7,217 | 55 | 51 | 143 |
| Control | 100 | 0 | 2.71 | 3,542 | 5,759 | 144 | 235 | 25 |
| Heat-treated | 100 | 0 | 2.77 | 6,546 | 10,879 | 35 | 58 | 187 |

EXAMPLE 17

The procedure of Example 5, Part B, was repeated except that the doctor knife thickness was varied in order to observe the effect of varying film thickness on the permeation of hydrogen and methane. Details of this study are shown in Table XII.

TABLE XII

| Film | Thickness (mils) Knife | Thickness (mils) Film | $H_2$ permeation GTR | $H_2$ permeation cB | $CH_4$ permeation GTR | $CH_4$ permeation cB | Selectivity, $H_2/CH_4$ |
|---|---|---|---|---|---|---|---|
| Control | 3 | 0.23 | 16,258 | 2,244 | 126 | 17 | 129 |
| Heat-treated | 3 | 0.27 | 17,730 | 2,872 | 184 | 30 | 96 |
| Control | 10 | 0.50 | 9,952 | 2,986 | 173 | 52 | 58 |
| Heat-treated | 10 | 0.51 | 12,754 | 3,903 | 49 | 15 | 260 |
| Control | 25 | 1.61 | 3,054 | 2,950 | 70 | 68 | 44 |
| Heat-treated | 25 | 1.27 | 4,610 | 3,513 | 14 | 11 | 329 |

EXAMPLE 18

The procedure of Example 6, Part B, was repeated except that the doctor knife thickness was varied in order to observe the effect of varying film thickness on the permeation of hydrogen and methane. Details of this study are shown in Table XIII.

TABLE XIII

| Film | Thickness (mils) Knife | Thickness (mils) Film | $H_2$ permeation GTR | $H_2$ permeation cB | $CH_4$ permeation GTR | $CH_4$ permeation cB | Selectivity, $H_2/CH_4$ |
|---|---|---|---|---|---|---|---|
| Control | 15 | 0.70 | 5,213 | 2,189 | 96 | 40 | 54 |
| Heat-treated | 15 | 0.75 | 9,056 | 4,075 | 153 | 69 | 59 |
| Control | 20 | 0.95 | 4,423 | 2,521 | 90 | 51 | 49 |
| Heat-treated | 20 | 0.94 | 7,886 | 4,448 | 49 | 28 | 161 |
| Control | 25 | 1.30 | 3,680 | 2,870 | 66 | 52 | 56 |
| Heat-treated | 25 | 1.20 | 5,586 | 4,022 | 29 | 21 | 193 |
| Control | 30 | 1.58 | 2,736 | 2,594 | 51 | 49 | 54 |
| Heat-treated | 30 | 1.49 | 5,615 | 5,020 | 32 | 30 | 175 |
| Control | 40 | 2.28 | 2,298 | 3,144 | 49 | 67 | 47 |
| Heat-treated | 40 | 2.50 | 3,724 | 5,586 | 16 | 24 | 233 |
| Control | 50 | 4.69 | 774 | 2,178 | 19 | 53 | 41 |
| Heat-treated | 50 | 3.33 | 3,767 | 7,526 | 18 | 35 | 209 |

EXAMPLE 19

The procedure of Example 9, Part B, was repeated to obtain a control film and a heat-treated film of the polyimide-amide. The 1.56-mil control film permeated oxygen at 105 GTR and 98 cB and nitrogen at 23 GTR and 22 cB. The $S_{O_2/N_2}$ was 4.6. The 1.42-mil heat-treated film permeated oxygen at 103 GTR and 88 cB and nitrogen at 15 GTR and 13 cB. The $S_{O_2/N_2}$ was 6.9.

EXAMPLE 20

A solution of 15 g. of the polyimide of Example 5, Part A, and 4.5 g. of lithium nitrate in 85 g. of dimethylacetamide was filtered through a 0.45$\mu$ silver membrane. Two films were cast from this solution on Vydax®-coated Inconel® plates at 100° C. using a 25-mil doctor knife. The films were covered and dried at 100° C. for 5 minutes. The cover vents were then opened and the films further dried at 100° C. for 10 minutes. The two films on their casting plates were then quenched into ice water where they were soaked for 15 minutes. The films were then stripped from the plates and soaked in fresh ice water for 45 minutes. Before testing, the first film was air-dried and the second film was heat-treated at 260° C. for 6 hours under a vacuum of 2$\mu$. The resulting films were asymmetric. The air-dried film permeated $H_2$ at 17,420 GTR and $CH_4$ at 155 GTR. The $S_{H_2/CH_4}$ was 112. The heat-treated film permeated $H_2$ at 20,499 GTR and $CH_4$ at 181 GTR. The $S_{H_2/CH_4}$ was 113.

EXAMPLE 21

Part A.—Polyester from isophthaloyl chloride and 2,2-bis-(3,5-dichloro-4-hydroxyphenyl)propane A mixture of 183 g. of 2,2-bis(3,5-dichloro-4-hydroxyphenyl)propane, 1 liter of s-tetrachloroethane, 0.72 g. of $AlCl_3$ and 101.6 g. of isophthaloyl chloride was heated and stirred under nitrogen at reflux for 1 hour. The resulting viscous polyester solution was allowed to cool and 1 ml. of water was added with vigorous stirring. The resulting solution contained about 17% polyester. The polyester was precipitated in hexane with vigorous agitation, filtered and dried.

The repeating unit of the polyester prepared as above was checked against requirements (a), (b) and (c) as follows:

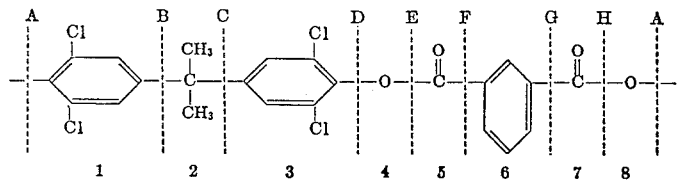

| Rigid subunit | Colinearity | Restricted bonds |
|---|---|---|
| 1 | L | A |
| 2 | N | |
| 3 | L | D |
| 4 | N | D |
| 5 | N | |
| 6 | N | |
| 7 | N | |
| 8 | N | A |

The repeating unit was 2 L and 6 N rigid subunits, 4 bonds with restricted rotation, 2 of the N subunits have at least one bond with restricted rotation, and 18/23 (78%) of the atoms in the chain are aromatic.

Part B

A solution of 24 g. of the polyester of Part A above, in 136 g. of tetrachloroethane was filtered through a 3μ silver membrane and degassed. The solution was cast on a Vydax®-coated glass plate at 60° C. with a 25-mil doctor knife. The film was covered, dried for 5 minutes with the cover vents closed, and for 10 minutes with the vents open. The glass plate was then removed from the hot casting stage, allowed to cool to room temperature, and the film stripped. A second film was prepared in identical manner. The first film was air-dried. The second film was air-dried and then heat-treated at 260° C. for 6 hours under a vacuum of 2μ. The 2.15-mil air-dried film permeated $H_2$ at 1074 GTR and 1385 cB and $CH_4$ at 68 GTR and 88 cB. The $S_{H_2/CH_4}$ was 16. The 2.25-mil heat-treated film permeated $H_2$ at 1528 GTR and 2063 cB and $CH_4$ at 11 GTR and 15 cB. The $S_{H_2/CH_4}$ was 139.

EXAMPLE 22

Part A.—Poly(4-isopropyl-m-phenylene) isophthalamide

A glass reactor equipped with a stirrer, reflux condenser and dropping funnels was flamed out under vacuum and purged with nitrogen. Into the reactor was placed 83.62 g. (0.567 mole) of 4-isopropyl-m-phenylenediamine (cumenediamine). Dimethylacetamide (884.2 g.) was added in two portions with stirring and the resulting solution was cooled to about 0° C. Isophthaloyl chloride (116.75 g., 0.575 mole) was added in small portions over a period of 6 hours, the reaction temperature being held in the range of 41 to 52° C. The reaction mixture was then drowned in ice and water with vigorous agitation. The precipitated polyamide was recovered by filtration and dried to constant weight. There was obtained 150 g. of polyamide with inherent viscosity of 0.38. Inherent viscosities in this and the following examples were measured at 0.1% weight/volume in dimethylacetamide at 25° C.

The repeating unit of the polyamide prepared as shown above was checked against requirements (a), (b) and (c) as follows:

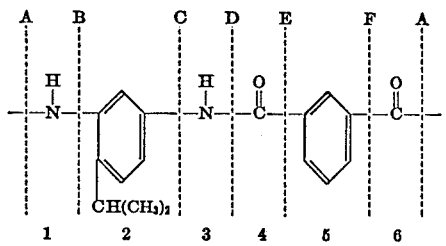

| Rigid subunit | Colinearity | Restricted bonds |
|---|---|---|
| 1 | N | B |
| 2 | N | B |
| 3 | N | |
| 4 | N | |
| 5 | N | |
| 6 | N | |

The repeating unit has 6 N subunits, 1 bond with restricted rotation 2 of the N subunits have 1 bond with restricted rotation, and 12/16 of the main chain atoms are aromatic.

Part B

A solution of 40 g. of the polyamide from Part A in 160 g. of dimethylacetamide was filtered through a 0.45μ silver membrane and degassed. Several films were cast on a Vydax®-coated glass plate at 110 C. with a 15-mil doctor knife. The films were covered and dried for 5 minutes at 110° C. with the cover vents closed and 10 minutes with the vents open. The films were stripped from the plate. The first film was air-dried only and used as a control. Five of the films were each dried under a vacuum of 2μ for 2 hours at 100° C. and then heat-treated, respectively, at the temperatures shown in Table XIV for 6 hours under a vacuum of 2μ. All the films were tested for permeation of $H_2$ and $CH_4$ as shown in Table XIV.

TABLE XIV

| Heat treatment, temperature, °C. | Thickness, mils | $H_2$ GTR | cB | $CH_4$ GTR | cB | Selectivity, $H_2/CH_4$ |
|---|---|---|---|---|---|---|
| Control | 1.48 | 1,104 | 980 | 19 | 17 | 58 |
| 150 | 1.45 | 1,110 | 966 | 9 | 8 | 123 |
| 175 | 1.44 | 1,087 | 939 | 8 | 7 | 136 |
| 200 | 1.49 | 1,034 | 924 | 7 | 6 | 148 |
| 225 | 1.36 | 1,179 | 962 | 7 | 6 | 168 |
| 260 | 1.50 | 944 | 850 | 5 | 4 | 189 |

A portion of the film heat-treated at 260° C. was also tested for permeation of $O_2$ and $N_2$. It permeated $O_2$ at 28 GTR and 25 cB and $N_2$ at 5 GTR and 5 cB. The $S_{O_2/N_2}$ was 5.6.

EXAMPLE 23

Part A.—Poly(4-isopropyl-m-phenylene) terephthalamide

Using the procedure of Example 22, Part A, a solution of 64.12 g. (0.427 mole) of 4-isopropyl-m-phenylenediamine in 678 g. of dimethylacetamide was treated slowly with 86.65 g. (0.427 mole) of terephthaloyl chloride during a period of 2.5 hours, keeping the reaction temperature in the range of 35 to 55° C. After the indicated recovery, there was obtained 111 g. of polyamide of inherent viscosity 0.41.

The repeating unit of the polyamide prepared as above was checked against requirements (a), (b) and (c) as follows:

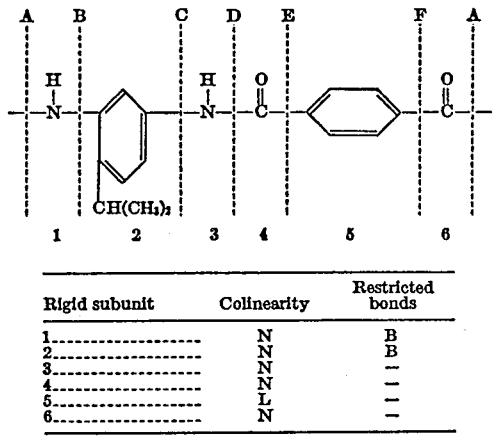

| Rigid subunit | Colinearity | Restricted bonds |
|---|---|---|
| 1 | N | B |
| 2 | N | B |
| 3 | N | — |
| 4 | N | — |
| 5 | L | — |
| 6 | N | — |

The repeating unit have five N and one L subunits, one bond with restricted rotation, two of the N subunits have one bond with restricted rotation and 12/16 of the main chain atoms are aromatic.

Part B

A solution of 15 g. of the polyamide from Part A in 85 g. of dimethylacetamide was filtered through a 0.45μ silver membrane, degassed and six films were cast on a Vydax® coated glass plate at 110° C. with a 15-mil doctor knife. The films were covered and dried for 5 minutes at 110° C. with the cover vents closed and 10 minutes with the vents open. The films were stripped from the plate. The first film was air-dried and used as a control. The other five films were each placed under a vacuum of 2μ for 2 hours at 100° C. and then heat-treated, respectively, at the temperatures shown in Table XV for 6 hours under a vacuum of 2μ. All the films were tested for permeation of $H_2$ and $CH_4$ as shown in Table XV.

TABLE XV

| Heat treatment temperature, °C. | Thickness, mils | $H_2$ GTR | cB | $CH_4$ GTR | cB | Selectivity, $H_2/CH_4$ |
|---|---|---|---|---|---|---|
| Control | 1.25 | 1,240 | 930 | 20 | 15 | 62 |
| 150 | 1.24 | 1,434 | 1,067 | 11 | 8 | 130 |
| 175 | 1.30 | 1,544 | 1,204 | 13 | 10 | 119 |
| 200 | 1.35 | 1,561 | 1,264 | 14 | 11 | 112 |
| 225 | 1.37 | 1,547 | 1,272 | 14 | 11 | 111 |
| 260 | 1.29 | 1,581 | 1,224 | 13 | 10 | 122 |

EXAMPLE 24

Part A.—Poly(4-isopropyl-m-phenylene) isophthalamide/terephthalamide

Using the procedure of Example 22, Part A, a solution of 47.37 g. (0.315 mole) of 4-isopropyl-m-phenylenediamine in 501 g. of dimethylacetamide was treated slowly with 64.12 g. (0.315 mole) of a 70/30 mixture of isophthaloyl chloride/terephthaloyl chloride during a period of 5 hours, keeping the reaction temperature in the range of 45–50° C. After the indicated recovery, there was obtained 86 g. of copolyamide of inherent viscosity 0.53.

The repeating unit of the copolyamide prepared as shown above was checked against requirements (a), (b) and (c) as follows:

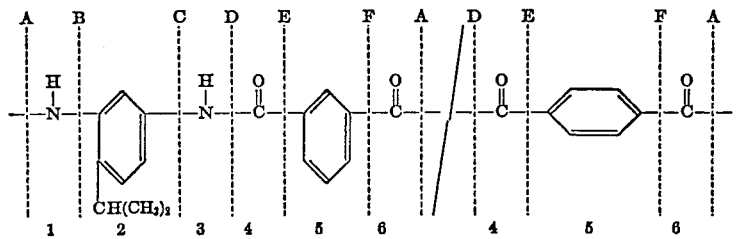

| Rigid subunit | Colinearity | Restricted bonds |
|---|---|---|
| 1 | N | B |
| 2 | N | B |
| 3 | N | |
| 4 | N | |
| 5 | N (I) L (T) | |
| 6 | N | |

The repeating unit (I) has six N subunits. The repeating unit (T) has five N and one L subunits. In both (I) and (T), two of the N subunits have one bond with restricted rotation and 12/16 of the main chain atoms are aromatic.

The repeating unit of the copolyamide prepared as shown above was checked against requirements (a), (b) and (c) as follows:

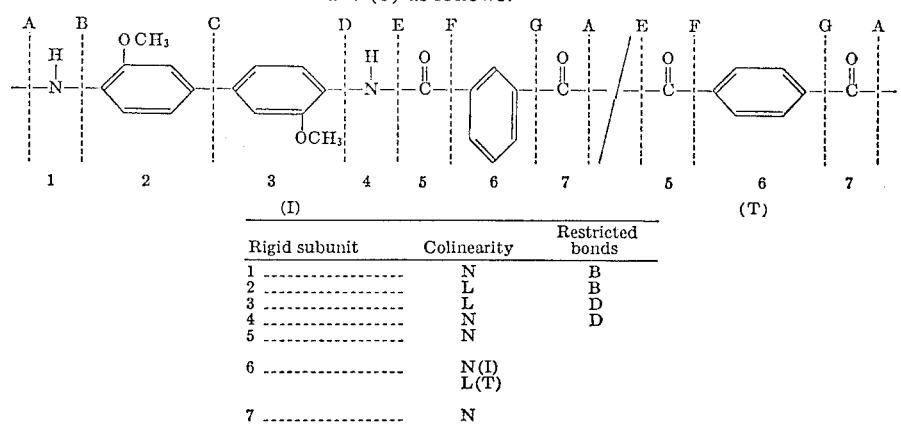

| Rigid subunit | Colinearity | Restricted bonds |
|---|---|---|
| 1 | N | B |
| 2 | L | B |
| 3 | L | D |
| 4 | N | D |
| 5 | N | |
| 6 | N(I) L(T) | |
| 7 | N | |

Part B

A solution of 20 g. of the copolyamide of Part A in 80 g. of dimethylacetamide was filtered through a 0.45μ silver membrane; degassed and six films were cast on a Vydax® coated glass plate at 110° C. with a 15-mil doctor knife. The films were covered, dried for 5 minutes at 110° C. with the cover vents closed and then for 10 minutes with the vents open. The films were stripped from the plate. The first film was air-dried and used as a control. The other five films were each dried under a vacuum of 2μ for 2 hours at 100° C. and then heat-treated, respectively, at the temperatures shown in Table XVI for 6 hours under a vacuum of 2μ. All the films were then tested for permeation of $H_2$ and $CH_4$ as shown in Table XVI.

TABLE XVI

| Heat treatment temperature, °C. | Thickness, mils | $H_2$ GTR | $H_2$ cB | $CH_4$ GTR | $CH_4$ cB | Selectivity, $S_{H_2/CH_4}$ |
|---|---|---|---|---|---|---|
| Control | 1.34 | 1,103 | 887 | 25 | 20 | 44 |
| 150 | 1.38 | 1,171 | 970 | 9 | 8 | 130 |
| 175 | 1.39 | 1,269 | 1,058 | 11 | 9 | 115 |
| 200 | 1.39 | 1,213 | 1,012 | 9 | 8 | 135 |
| 225 | 1.36 | 1,348 | 1,100 | 10 | 8 | 135 |
| 250 | 1.26 | 1,193 | 902 | 902 | 6 | 170 |

EXAMPLE 25

Part A.—Poly(3,3'-dimethoxybiphenylene) isophthalamide/terephthalamide

Using the procedure of Example 22, Part A, a solution of 24.463 g. of 3,3'-dimethoxybenzidine in 212 g. of dimethylacetamide was treated slowly with 20.333 g. of a 70/30 mixture of isophthaloyl chloride/terephthaloyl chloride during a period of 2.5 hours, keeping the reaction temperature in the range of 36–50° C. After the indicated recovery, there was obtained 35 g. of copolyamide of inherent viscosity 1.80.

The repeating unit (I) has 5 N and 2 L subunits. The repeating unit (T) has 4 N and 3 L subunits. In both (I) and (T), two of the N subunits have 1 bond with restricted rotation and 18/22 of the main chain atoms are aromatic.

Part B

A solution of 15 g. of the copolyamide of Part A in 85 g. of dimethylacetamide was filtered through a 0.5μ silver membrane, degassed and two films were cast on a Vydax®-coated glass plate at 110° C. with a 25-mil doctor knife. The films were covered, dried for 5 minutes at 110° C. with the cover vents closed and for 10 minutes with the vents open. The first film was air-dried and used as a control. The second film was dried at 100° C. for 2 hours under a vacuum of 2μ and then heat-treated at 260° C. for 6 hours under a vacuum of 2μ. The 1.52-mil air-dried film permeated $H_2$ at 440 GTR and 401 cB and $CH_4$ at 6.1 GTR and 5.6 cB. The $S_{H_2/CH_4}$ was 72. The 2.47-mil heat-treated film permeated $H_2$ at 239 GTR and 354 cB and $CH_4$ at 0.4 GTR and 0.6 cB. The $S_{H_2/CH_4}$ was 598.

EXAMPLE 26

Part A.—Poly(4,4'-[bis(trifluoromethyl)methylene] di-p-phenylene) isophthalamide/terephthalamide Using the procedure of Example 22, Part A, a solution of 50.142 g. of 4,4'-diaminodiphenylbis(trifluoromethyl)-methane in 426 g. of dimethylacetamide was treated slowly with 30.455 g. of a 70/30 mixture of isophthaloyl chloride/terephthaloyl chloride during a period of 4.5 hours, keeping the reaction temperature in the range of 40–47° C. After the indicated recovery, there was obtained 68 g. of copolyamide of inherent viscosity 1.37.

The repeating unit of the copolyamide prepared as shown above was checked against requirements (a), (b) and (c) as follows:

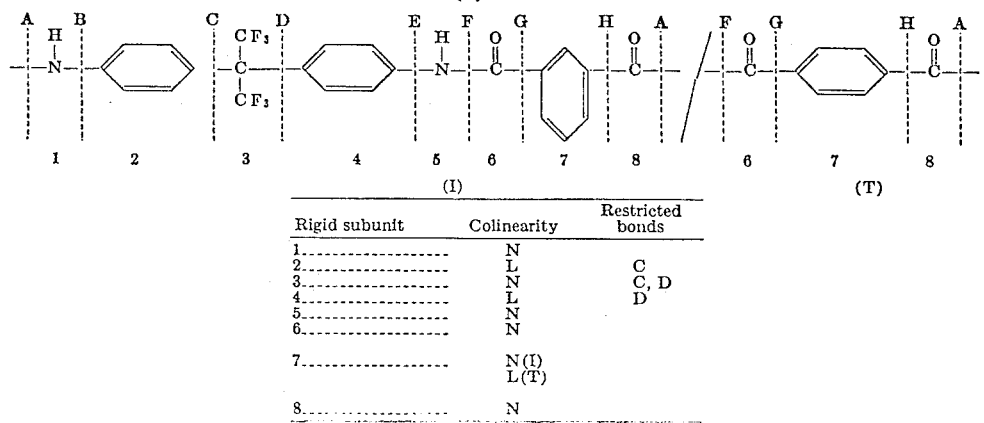

| Rigid subunit | Colinearity | Restricted bonds |
|---|---|---|
| 1 | N | |
| 2 | L | C |
| 3 | N | C, D |
| 4 | L | D |
| 5 | N | |
| 6 | N | |
| 7 | N(I) L(T) | |
| 8 | N | |

The repeating unit (I) has 6 N and 2 L subunits. The repeating unit (T) has 5 N and 3 L subunits. In both (I) and (T), one of the N subunits has 2 bonds with restricted rotation and 18/23 of the main chain atoms are aromatic.

Part B

A solution of 15 g. of the copolyamide of Part A in 85 g. of dimethylacetamide was filtered through a 0.8μ silver membrane, degassed and two films were cast on a Vydax® coated glass plate at 110° C. with a 15-mil doctor knife. The films were covered, dried for 5 minutes at 110° C. with the cover vents closed and for 10 minutes with the vents open. The first film was air-dried and used as a control. The second film was dried at 100° C. for 2 hours under a vacuum of 2μ and then heat-treated at 225° C. for 6 hours under a vacuum of 2μ. The 1.43-mil air-dried film permeated $H_2$ at 2304 GTR and 1977 cB and $CH_4$ at 41 GTR and 35 cB. The $S_{H_2/CH_4}$ was 56. The 1.48-mil heat-treated film permeated $H_2$ at 3543 GTR and 3146 cB and $CH_4$ at 21 GTR and 19 cB. The $S_{H_2/CH_4}$ was 169.

EXAMPLE 27

Part A.—Poly[4,4'-benzylidenebis(2,5-diethoxy-p-phenylene) isophthalamide/terephthalamide Using the procedure of Example 22, Part A, a solution of 18.475 g. of 4,4'-diamino-2,5,2',5'-tetraethoxytriphenylmethane in 135 g. of dimethylacetamide was treated slowly with 8.324 g. of a 70/30 mixture of isophthaloyl chloride/terephthaloyl chloride during a period of 7 hours, keeping the reaction temperature in the range of 40–50° C. After the indicated recovery, there was obtained 23 g. of copolyamide of inherent viscosity 0.81.

The repeating unit of the copolyamide prepared as shown above was checked against requirements (a), (b) and (c) as follows:

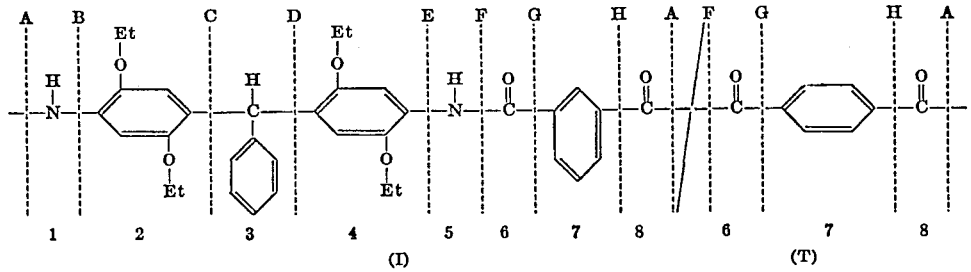

| Rigid subunit | Colinearity | Restricted bonds |
|---|---|---|
| 1 | N | B |
| 2 | L | B, C |
| 3 | N | C, D |
| 4 | L | D, E |
| 5 | N | E |
| 6 | N | |
| 7 | N(I) L(T) | |
| 8 | N | |

The repeating unit (I) has 6 N and 2 L subunits. The repeating unit (T) has 5 N and 3 L subunits. In both (I) and (T), three of the N subunits have at least 1 restricted bond and 18/23 of the main chain atoms are aromatic.

Part B

A solution of 15 g. of the copolyamide of Part A in 60 g. of dimethylacetamide was filtered through a 0.8μ silver membrane, degassed and two films were cast on a Vydax® coated glass plate at 110° C. with a 15-mil doctor knife. The films were covered, dried for 5 minutes at 110° C. with the cover vents closed and for 10 minutes with the vents open. The first film was dried overnight at room temperature under a vacuum of 2μ and used as a control. The second film was first dried overnight at room temperature under a vacuum of 2μ and then heat-treated at 260° C. for 6 hours under a vacuum of 2μ. The 1.59-mil control film permeated $H_2$ at 3641 GTR and 3474 cB and $CH_4$ at 226 GTR and 216 cB. The $S_{H_2/CH_4}$ was 16. The 1.86-mil heat-treated film permeated $H_2$ at 3524 GTR and 3933 cB and $CH_4$ at 184 GTR and 205 cB. The $S_{H_2/CH_4}$ was 19.

EXAMPLE 28

Part A.—Poly(2,5,2',5'-tetrachlorobiphenylene) isophthalamide

Using a procedure like that of Example 22, Part A, a polyamide was prepared from 32.203 g. of 2,5,2',5'-tetrachlorobenzidine and 20.302 g. of isophthaloyl chloride in 170 ml. of N-methylpyrrolidone solvent at 20–45° C. The recovered polyamide had an inherent viscosity of 0.81.

The repeating unit of the polyamide prepared as shown above checked against requirements (a), (b), and (c) as follows:

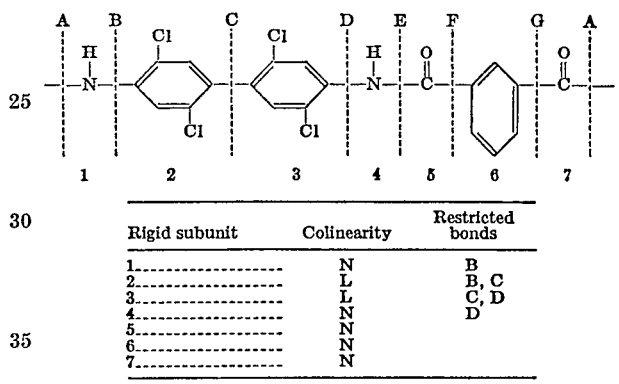

| Rigid subunit | Colinearity | Restricted bonds |
|---|---|---|
| 1 | N | B |
| 2 | L | B, C |
| 3 | L | C, D |
| 4 | N | D |
| 5 | N | |
| 6 | N | |
| 7 | N | |

The repeating unit has 5 N and 2 L subunits and 3 bonds with restricted rotation. Two of the N subunits each have one bond with restricted rotation and 18/22 of the main chain atoms are aromatic.

Part B

A solution of 15 g. of the polyamide of Part A in 85 g. of dimethylacetamide was filtered through a 0.45μ silver membrane, degassed and two films were cast on a Vydax® coated glass plate at 110° C. with a 15-mil doctor knife. The films were covered, dried for 5 minutes with the cover vents closed and for 10 minutes with the vents open. The films were stripped from the plate and dried under a vacuum of 2μ at room temperature overnight. The first film was used as a control. The second was further dried for 2 hours at 100° C. under a vacuum of 2μ and then heat-treated at 200° C. for 6 hours under a vacuum of 2μ. The 0.73-mil control film permeated H₂ at 1315 GTR and 576 cB and CH₄ at 18 GTR and 8 cB. The $S_{H_2/CH_4}$ was 73. The 0.76-mil heat-treated film permeated H₂ at 1181 GTR and 539 cB and CH₄ at 2.7 GTR and 1.2 cB. The $S_{H_2/CH_4}$ was 437. The heat-treated film permeated O₂ at 36 GTR and 16 cB and N₂ at 5 GTR and 2.3 cB. The $S_{O_2/N_2}$ was 7.2.

EXAMPLE 29

Part A.—Poly(2,5,2',5'-tetrachlorobiphenylene) oxydibenzamide

Using a procedure like that of Example 22, Part A, a polyamide was prepared from 161.01 g. of 2,5,2',5'-tetrachlorobenzidine and 147.56 g. of the dichloride of oxydibenzoic acid in 1200 ml. of dimethylacetamide solvent at 5–50° C. The recovered polyamide had an inherent viscosity of 0.76.

The repeating unit of the polyamide prepared as shown above was checked against requirements (a), (b) and (c) as follows:

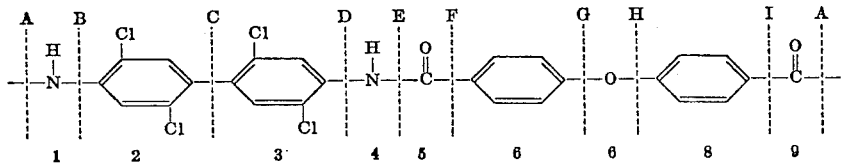

| Rigid subunit | Colinearity | Restricted bonds |
|---|---|---|
| 1 | N | B |
| 2 | L | B, C |
| 3 | L | C, D |
| 4 | N | D |
| 5 | N | |
| 6 | L | |
| 7 | N | |
| 8 | L | |
| 9 | N | |

The repeating unit has 5 N and 4 L subunits and 3 bonds with restricted rotation. Two of the N subunits each have one bond with restricted rotation and 24/29 of the main chain atoms are aromatic.

Part B

A solution of 15 g. of the polyamide of Part A in 85 g. of dimethylacetamide was filtered through a 0.45μ silver membrane, degassed and two films were cast on a Vydax® coated glass plate at 110° C. with a 25-mil doctor knife. The films were covered, dried for 5 minutes at 110° C. with the cover vents closed and for 10 minutes with the vents open. The films were stripped from the plate and dried under a vacuum of 2μ at room temperature overnight. The first film was used as a control. The second film was further dried for 2 hours at 100° C. under a vacuum of 2μ and then heat-treated at 260° C. for 6 hours under a vacuum of 2μ. The 1.48-mil control film permeated H₂ at 609 GTR and 541 cB and CH₄ at 11 GTR and 9.8 cB. The $S_{H_2/CH_4}$ was 55. The 1.45-mil heat-treated film permeated H₂ at 886 GTR and 771 cB and CH₄ at 5.3 GTR and 4.6 cB. The $S_{H_2/CH_4}$ was 167.

EXAMPLE 30

Part A.—Poly(4,6-dichloro-m-phenylene)isophthalamide/terephthalamide

In the manner of Example 29, Part A, a copolyamide was prepared from equimolar quantities of 4,6-dichloro-m-phenylenediamine and a 70/30 mixture of isophthaloyl chloride/terephthaloyl chloride.

The repeating unit of the copolyamide noted above was checked against requirements (a), (b) and (c) as follows:

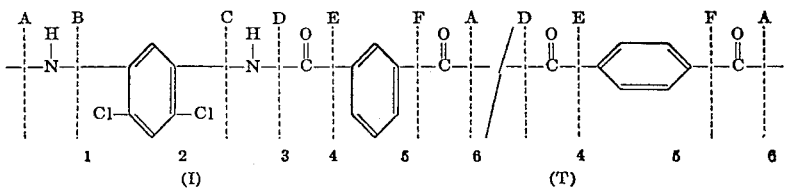

| Rigid subunit | Colinearity | Restricted bonds |
|---|---|---|
| 1 | N | B |
| 2 | N | B, C |
| 3 | N | C |
| 4 | N | |
| 5 | N (I) L (T) | |
| 6 | N | |

The repeating unit (I) has 6 N subunits. The repeating unit (T) has 5 N subunits and 1 L subunit. In both (I) and (T), three of the N subunits have at least one bond with restricted rotation and 12/16 of the main chain atoms are aromatic.

Part B

A solution of 20 g. of the copolyamide of Part A in 80 g. of dimethylacetamide was filtered through a 0.45μ silver membrane, degassed and two films were cast on a Vydax® coated glass plate at 90° C. using a 15-mil doctor knife. The films were covered, dried for 5 minutes at 90° C. with the cover vents closed and for 10 minutes with the vents open. The first film was air-dried and used as a control. The second film was air-dried and then heat-treated at 260° C. for 6 hours under a vacuum of 2μ. The 1.17-mil control film permeated H₂ at 574 GTR and 403 cB and CH₄ at 7.4 GTR and 5.2 cB. The $S_{H_2/CH_4}$ was 78. The 1.16-mil heat-treated film permeated H₂ at 499 GTR and 347 cB and CH₄ at 1.3 GTR and 0.9 cB. The $S_{H_2/CH_4}$ was 384.

EXAMPLE 31

Part A.—Poly(2,6-dichloro-p-phenylene) isophthalamide-terephthalamide

In the manner of Example 29, Part, A, a copolyamide was prepared from equimolar quantities of 2,6-dichloro-p-phenylenediamine and a 70/30 mixture of isophthaloyl chloride/terephthaloyl chloride.

The repeating unit of the copolyamide noted above was checked against requirements (a), (b) and (c) as follows:

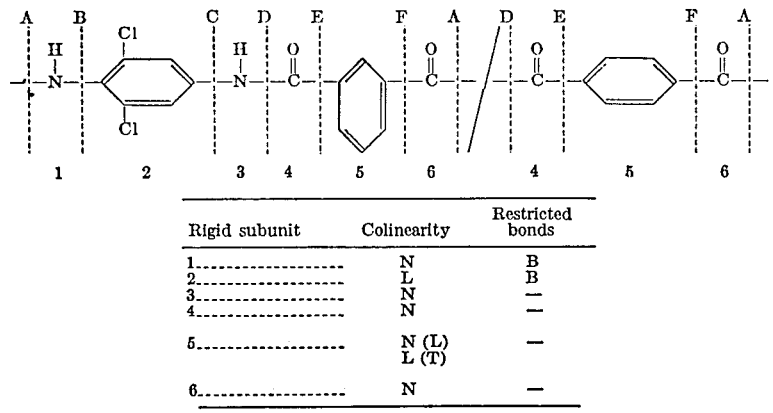

| Rigid subunit | Colinearity | Restricted bonds |
|---|---|---|
| 1 | N | B |
| 2 | L | B |
| 3 | N | — |
| 4 | N | — |
| 5 | N (L) L (T) | — |
| 6 | N | — |

The repeating unit (I) has 5 N and 1 L subunits. The repeating unit (T) has 4 N and 2 L subunits. In both (I) and (T), one N unit has one bond with restricted rotation and 12/16 of the main chain atoms are aromatic.

$4'$-diphenylhexafluoroisopropylidene tetracarboxylic dianhydride. Films were prepared from this copolyimide by two methods. In Method A a 15% solution of the copolyimide in dimethylacetamide was cast on a Vydax® coated glass plate at 100° C. using a 25-mil doctor knife. In Method B a 12.5% solution of the copolyimide in tetrachloroethane was cast on a Vydax® coated glass plate at 100° C. using a 20-mil doctor knife. In both methods films were covered, dried for 5 minutes at 100° C. with the cover vents closed and then for 10 minutes with the vents open. The films were stripped from the plate and air-dried. As shown in Table XVII one film was tested for permeation without further treatment. The others were heat-treated at 260° C. in air or under vacuum for the times indicated in Table XVII.

TABLE XVII

| Film method: | Treatment at 260° C. in air (min.) | Thickness (mils) | $H_2$ Permeation GTR | $H_2$ Permeation cB | $CH_4$ permeation GTR | $CH_4$ permeation cB | $S_{H_2/CH_4}$ |
|---|---|---|---|---|---|---|---|
| A | None | 1.59 | 7,210 | 6,878 | 247 | 236 | 29 |
| A | 1.0 | 1.68 | 4,760 | 4,798 | 49 | 49 | 97 |
| A | 2.0 | 1.69 | 5,960 | 6,043 | 58 | 59 | 10 |
| A | 3.0 | 1.71 | 5,859 | 6,011 | 54 | 56 | 109 |
| A | 4.0 | 1.68 | 6,707 | 6,761 | 58 | 59 | 116 |
| A | 7.5 | 1.68 | 7,342 | 7,401 | 47 | 47 | 156 |
| A | 10.0 | 1.67 | 8,699 | 8,716 | 69 | 69 | 126 |
| A | 12.5 | 1.61 | 9,443 | 9,122 | 71 | 69 | 133 |
| B | 60.0 | 1.74 | 7,584 | 7,918 | 35 | 37 | 217 |
| B | *60.0 | 1.43 | 9,536 | 8,182 | 79 | 68 | 121 |

* Heat-treated under a vacuum of $2\mu$.

Part B

A solution of 15 g. of the copolyamide of Part A in 85 g. of dimethylacetamide was filtered through a $0.5\mu$ silver membrane, degassed and two films were cast on a Vydax® coated glass plate at 90° C. using a 25-mil doctor knife. The films were covered, dried for 5 minutes at 90° C. with the cover vents closed and for 10 minutes with the vents open. Thhe first film was air-dried and used as a control. The second film was air-dried and then heat-treated at 260° C. for 6 hours under a vacuum of $2\mu$. The 1.22-mil control film permeated $H_2$ at 925 GTR and 677 cB and $CH_4$ at 13 GTR and 9.6 cB. The $S_{H_2/CH_4}$ was 71. The 1.23-mil heat-treated film permeated $H_2$ at 707 GTR and 522 cB and $CH_4$ at 1.2 GTR and 0.9 cB. The $S_{H_2/CH_4}$ was 589.

EXAMPLE 32

Comparison of heat-treatment at atmospheric pressure with heat-treatment under vacuum A copolyimide was prepared by the procedure of Example 14, Part A, from a 65/35 mixture of 1,5-diaminonaphthalene/4,4'-diaminodiphenyl ether and 3,4,3',

EXAMPLE 33

Part A.—Polyester from 2,2-bis(3,5-dichloro-4-hydroxyphenyl)propane and isophthaloyl chloride/terephthaloyl chloride 70/30

A dried glass reactor was charged with a solution of 109.83 g. (0.3 mole) of 2,2-bis(3,5-dichloro-4-hydroxyphenyl)propane in 490 ml. of dry pyridine and 60.91 g. (0.3 mole) of a 70/30 molar mixture of isophthaloyl chloride/terephthaloyl chloride was added over a period of 2 hours. The temperature ranged from 30–51° C. during the addition. More dry pyridine (368 ml.) was added and the reaction mixture was thoroughly stirred. The resulting copolyester was precipitated by drowning the reaction mixture in ice and ice water with vigorous agitation. The polymer was washed thoroughly with water, dried on a filter overnight and further air-dried to constant weight at room temperature under a forced draft. The copolyester had an inherent viscosity of 0.78 at 0.1% concentration in N,N-dimethylacetamide at 25° C.

The repeating unit of the copolyester prepared as shown above was checked against requirements (a), (b) and (c) as follows:

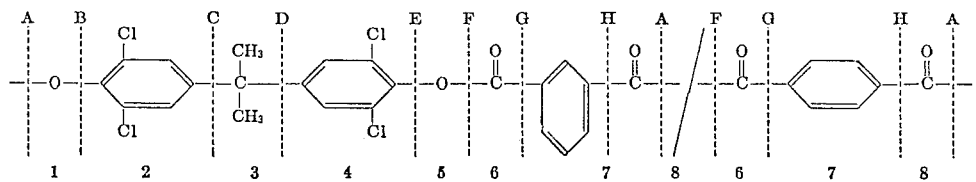

| Rigid subunit | Colinearity | Restricted bonds |
|---|---|---|
| 1 | N | B |
| 2 | L | B |
| 3 | N | |
| 4 | L | E |
| 5 | N | E |
| 6 | N | |
| 7 | N (I) | |
|   | L (T) | |
| 8 | N | |

The repeating unit (I) has 6 N and 2 L subunits. The repeating unit (T) has 5 N and 3 L subunits. In both (I) and (T) two of the N submits each have one bond with restrcted rotation and 18/28 of the main chain atoms are aromatic.

Part B

Films were prepared from the copolyester of Part A by four methods. In each method a solution of the indicated concentration in the indicated solvent was cast on a Vydax® coated glass plate at 100° C. using a doctor knife of the indicated clearance. The films were covered, dried for 5 minutes at 100° C. with the cover vents closed and then for 10 minutes with the vents open. The films were stripped from the plate and air-dried. In Method C a 15% solution in dimethylacetamide was cast under a 30-mil doctor knife. In Method D a 10% solution in tetrachloroethane was cast under a 25-mil doctor knife. In Method E a 15% solution in dimethylacetamide was cast under a 25-mil doctor knife. In Method F a 15% solution in dimethylacetamide was cast under a 20-mil doctor knife. As shown in Table XVIII one film was tested for permeation without further treatment. The others were heat-treated in air or under vacuum as indicated at the indicated temperatures for the indicated times prior to testing for permeation.

(c) more than 50% of the atoms in the main chain are in aromatic groups;

the said imide repeating unit having the formula

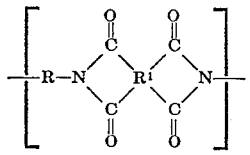

wherein R and $R^1$ are, respectively, a divalent and tetravalent organic radical; the said ester repeating unit having the formula

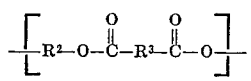

wherein each of $R^2$ and $R^3$, alike or different, is a divalent organic radical; and the said aromatic amide repeating unit having the formula

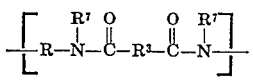

wherein R and $R^3$ are as defined above and $R^7$ is hydrogen, lower alkyl or phenyl, the said membrane having been heated in an environment selected from the group consisting of air, inert gas and under vacuum at a temperature range of 150° C. up to just below its softening point.

TABLE XVIII

| | Treatment in air | | Thickness (mils) | $H_2$ permeation | | $CH_4$ permeation | | $SH_2/CH_4$ |
|---|---|---|---|---|---|---|---|---|
| | ° C. | Min. | | GTR | cB | GTR | cB | |
| Film method: | | | | | | | | |
| C | None | None | 1.63 | 1,596 | 1,561 | 36 | 35 | 44 |
| D | 235 | 30 | 1.61 | 2,521 | 2,435 | 18 | 17 | 140 |
| D | 240 | 60 | 1.50 | 2,514 | 2,263 | 16 | 15 | 157 |
| D | 240 | 120 | 1.51 | 2,680 | 2,428 | 18 | 16 | 149 |
| E | 260 | 10 | 1.27 | 3,481 | 2,653 | 24 | 19 | 145 |
| E | *260 | 60 | 1.73 | 2,330 | 2,419 | 15 | 15 | 155 |
| F | *260 | 120 | 1.04 | 3,772 | 2,354 | 24 | 15 | 157 |
| F | *260 | 360 | 1.19 | 3,486 | 2,489 | 22 | 16 | 158 |

*Heat-treated under a vacuum of 2μ.

The embodiments of the invention in which an exclusive property or privilege is claimed are defined as follows:

1. A semipermeable membrane of which at least 50% by weight consists essentially of a polymer whose main chain has a repeating unit containing at least one group selected from the group aromatic imide, aromatic ester and aromatic amide, in which said repeating unit
   (a) contains at least one rigid divalent subunit the two main chain single bonds extending from which are not colinear,
   (b) is sterically unable to rotate 360° around one or more of said main chain single bonds; and 2. A membrane according to Claim 1 which has been heated at a temperature of 150°–340° C.

3. A membrane according to Claim 1 which has been heated at a temperature of 200–340° C.

4. A membrane according to Claim 1 in which the polymer is a polyimide.

5. A membrane according to Claim 4 wherein the polymer is a polyimide from 3,4,3',4'-diphenylhexafluoroisopropylidene tetracarboxylic dianhydride and 1,5-diaminonaphthalene.

6. A membrane according to Claim 4 wherein the polymer is a polyimide from 3,4,3',4'-diphenylhexafluoroisopropylidene tetracarboxylic dianhydride and 4,4'-diaminodiphenyl ether.

7. A membrane according to Claim 4 wherein the polymer is a polyimide from 3,4,3',4'-diphenylhexafluoroisopropylidene tetracarboxylic dianhydride, 1,5-diaminonaphthalene and 4,4'-diaminodiphenyl ether.

8. A membrane according to Claim 4 wherein the polymer is a polyimide from 3,4,3',4'-diphenylhexafluoroisopropylidene tetracarboxylic dianhydride and m-phenylenediamine.

9. A membrane according to Claim 4 wherein the polymer is a polyimide from 3,4,3',4'-diphenylhexafluoroisopylidene tetracarboxylic dianhydride and p-phenylenediamine.

10. A membrane according to Claim 4 wherein the polymer is a polyimide from 3,4,3',4'-diphenylhexafluoroisopropylidene tetracarboxylic dianhydride and N,N'-m-phenylene-bis(m-aminobenzamide).

11. A membrane according to Claim 4 wherein the polymer is a polyimide from 3,4,3',4'-diphenylhexafluoroisopropylidene tetracarboxylic dianhydride and 3,5-diaminobenzoic acid.

12. The process of separating fluids using a membrane of Claim 4.

13. The process of separating gases using a membrane of Claim 4.

14. A fluid-separation apparatus comprising:
a fluid-permeation cell;
a fluid inlet and a fluid outlet connected to said cell; and
a membrane of Claim 4 dividing the cell between the inlet and the outlet.

15. A membrane according to Claim 1 in which the polymer is a polyester.

16. A membrane according to Claim 15 wherein the polymer is a polyester from isophthaloyl chloride and 2,2-bis(3,5-dichloro-4-hydroxyphenyl)propane.

17. The process of separating fluids using a membrane of Claim 15.

18. The process of separating gases using a membrane of Claim 15.

19. A fluid-separation apparatus comprising:
a fluid-permeation cell;
a fluid inlet and a fluid outlet connected to said cell; and
a membrane of Claim 15 dividing the cell between the inlet and the outlet.

20. A membrane according to Claim 1 in which the polymer is a polyamide.

21. A membrane according to Claim 20 wherein the polymer is a polyamide from isophthaloyl chloride and 4-isopropyl-m-phenylenediamine.

22. A membrane according to Claim 20 wherein the polymer is a polyamide from terephthaloyl chloride and 4-isopropyl-m-phenylenediamine.

23. A membrane according to Claim 20 wherein the polymer is a polyamide from isophthaloyl chloride, terephthaloyl chloride and 4-isopropyl-m-phenylenediamine.

24. A membrane according to Claim 20 wherein the polymer is a polyamide from isophthaloyl chloride, terephthaloyl chloride and 4,4'-diaminodiphenylbis(trifluoromethyl)methane.

25. A membrane according to Claim 20 wherein the polymer is a polyamide from isophthaloyl chloride and 2,5,2',5'-tetrachlorobenzidine.

26. A membrane according to Claim 20 wherein the polymer is a polyamide from isophthaloyl chloride, terephthaloyl chloride and 4,6-dichloro-m-phenylenediamine.

27. The process of separating fluids using a membrane of Claim 20.

28. The process of separating gases using a membrane of Claim 20.

29. A fluid-separation apparatus comprising:
a fluid-permeation cell;
a fluid inlet and a fluid outlet connected to said cell; and
a membrane of Claim 20 dividing the cell between the inlet and the outlet.

30. The process of separating fluids using a membrane of Claim 1.

31. The process of separating gases using a membrane of Claim 1.

32. A fluid-separation apparatus comprising:
a fluid-permeation cell;
a fluid inlet and a fluid outlet connected to said cell; and
a membrane of Claim 1 dividing the cell between the inlet and the outlet.

References Cited

UNITED STATES PATENTS

| | | | |
|---|---|---|---|
| 3,567,632 | 3/1971 | Richter et al. | 210—23 |
| 3,737,042 | 5/1973 | Boom | 210—23 |
| 3,172,741 | 3/1965 | Jolley | 55—16 |

FRANK J. SPEAR, Jr., Primary Examiner

F. LANDER, Assistant Examiner

U.S. Cl. X.R.

210—321, 500

UNITED STATES PATENT OFFICE
CERTIFICATE OF CORRECTION

Patent No. 3,822,202          Dated July 2, 1974

Inventor(s) Harvey Herbert Hoehn

It is certified that error appears in the above-identified patent and that said Letters Patent are hereby corrected as shown below:

Col. 4, line 57, "penanthrene" should read -- phenanthrene --;

Col. 6, line 35, the last word in the line should read -- barrer --;

Col. 7, line 14, the second formula should read

-- 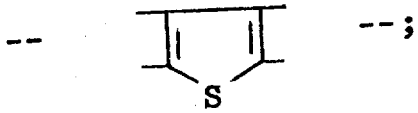 --;

Col. 10, item 6, the formula should read

-- 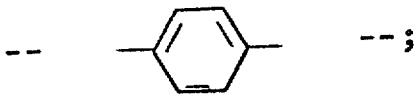 --;

Col. 13, item 34, the formula should read

-- 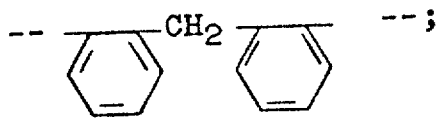 --;

UNITED STATES PATENT OFFICE
CERTIFICATE OF CORRECTION

Patent No. 3,822,202           Dated July 2, 1974

Inventor(s) Harvey Herbert Hoehn

It is certified that error appears in the above-identified patent and that said Letters Patent are hereby corrected as shown below:

Col. 13, item 35, the formula should read

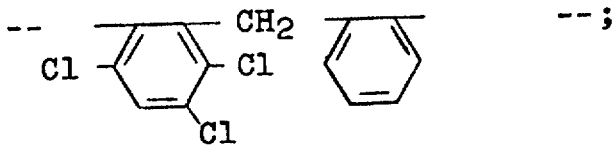

Col. 22, line 52, "are" should be deleted;

Col. 22, line 53, "CH" should read -- $CH_4$ --;

Col. 24, line 57, in Table VI, the right hand column, the last line of the heading should read -- $H_2/CH_4$ --;

Col. 25, Table VII, in the numbers under the heading "$H_2$ Permeation" the decimals should be read as commas;

Col. 25, Table VIII, in the numbers under the heading "$H_2$ Permeation" the decimals should be read as commas;

UNITED STATES PATENT OFFICE
CERTIFICATE OF CORRECTION

Patent No. 3,822,202             Dated July 2, 1974

Inventor(s)  Harvey Herbert Hoehn

It is certified that error appears in the above-identified patent and that said Letters Patent are hereby corrected as shown below:

Col. 26, line 14, in Table IX under the heading "Mole Percent" the first column subheading should read -- 1,5-ND --;

Col. 27, line 15, "IX" should read -- XI --;

Col. 27, line 75, "$SO_2/N_2$" should read -- $S O_2/N_2$ --;

Col. 29, line 29, "was" should read -- has --;

Col. 33, line 46, in Table XVI under the heading "$CH_4$" for the last entry in the column headed "GTR", "902" should read -- 7 --;

Col. 34, line 61, in the formula the bond between subunits 2 and 3 should extend through vertical dotted line C;

Col. 37, line 50, in the numbering of the subunit between vertical dotted lines G and H, "6" should be changed to -- 7 --;

Col. 39, line 29, for subunit 5 "N(L)" should read -- N(I) --;

PO-1050
(5/69)

UNITED STATES PATENT OFFICE
CERTIFICATE OF CORRECTION

Patent No. 3,822,202          Dated July 2, 1974

Inventor(s)

It is certified that error appears in the above-identified patent and that said Letters Patent are hereby corrected as shown below:

Col. 40, line 45, in Table XVII, in the third entry in the right hand column, "10" should read -- 103 --;

Col. 41, line 12, in the subunit designations of the formula, 7 should be located between dotted vertical lines G and H rather than below vertical dotted line H; 8 should be located between dotted vertical lines H and A (first occurrence) rather than below the diagonal between vertical dotted lines A and F; as a further designation under subunit 4, read "(I)"; and as a further designation under subunit 7 (second occurrence) read "(T)".

Signed and sealed this 11th day of March 1975.

(SEAL)
Attest:

RUTH C. MASON
Attesting Officer

C. MARSHALL DANN
Commissioner of Patents
and Trademarks